(12) United States Patent
Watabe et al.

(10) Patent No.: US 11,054,809 B2
(45) Date of Patent: Jul. 6, 2021

(54) CONTROL DEVICE FOR MACHINE TOOL

(71) Applicants: CITIZEN WATCH CO., LTD., Tokyo (JP); CITIZEN MACHINERY CO., LTD., Nagano (JP)

(72) Inventors: Shuichi Watabe, Fujimino (JP); Hitoshi Matsumoto, Kawagoe (JP)

(73) Assignees: Citizen Watch Co., Ltd., Tokyo (JP); Citizen Machinery Co., Ltd., Nagano (JP)

( * ) Notice: Subject to any disclaimer, the term of this patent is extended or adjusted under 35 U.S.C. 154(b) by 94 days.

(21) Appl. No.: 16/497,645

(22) PCT Filed: Feb. 20, 2018

(86) PCT No.: PCT/JP2018/005907
§ 371 (c)(1),
(2) Date: Sep. 25, 2019

(87) PCT Pub. No.: WO2018/180004
PCT Pub. Date: Oct. 4, 2018

(65) Prior Publication Data
US 2020/0209835 A1    Jul. 2, 2020

(30) Foreign Application Priority Data
Mar. 30, 2017   (JP) .............................. JP2017-068650

(51) Int. Cl.
*G05B 19/4155* (2006.01)
*B23Q 15/14* (2006.01)
*B23Q 15/22* (2006.01)

(52) U.S. Cl.
CPC ......... *G05B 19/4155* (2013.01); *B23Q 15/14* (2013.01); *B23Q 15/22* (2013.01)

(58) Field of Classification Search
None
See application file for complete search history.

(56) References Cited

U.S. PATENT DOCUMENTS

2011/0093666 A1   4/2011  Endo et al.
2011/0158775 A1   6/2011  Ando et al.
(Continued)

FOREIGN PATENT DOCUMENTS

CN   106794565 A   5/2017
EP   3205448 A1   8/2017
(Continued)

OTHER PUBLICATIONS

Supplementary European Search Report for EP 18776610 dated Nov. 12, 2020.

*Primary Examiner* — Ryan A Jarrett
(74) *Attorney, Agent, or Firm* — Knobbe, Martens, Olson & Bear, LLP

(57) ABSTRACT

A control device for a machine tool to efficiently and successively produce a plurality of different-shaped products is provided. In the control device, each driving shaft of modules is assigned to different control systems. The device includes a multi-system program storage part for storing a plurality of multi-system programs to machine a workpiece in different shapes, a multi-system program dividing part for dividing the multi-system programs into machining programs, a divided program storage part for storing the divided machining programs individually, a system-based program storage part for storing the machining programs each corresponding to each of the control systems, and a machining program selection part for selecting a predetermined machining program from the divided program storage part in accordance with the machining step to be performed and for alternately storing the selected machining programs in two program storage parts of the system-based program storage part for the respective control systems.

6 Claims, 19 Drawing Sheets

(56) References Cited

U.S. PATENT DOCUMENTS

2017/0139401 A1* 5/2017 Hongo ................. G05B 19/414
2017/0293288 A1  10/2017 Nakaya et al.
2019/0202017 A1*  7/2019 Sagasaki ............... B23B 13/022

FOREIGN PATENT DOCUMENTS

| JP | S56-101206 A | 8/1981 |
| JP | 2009125920 A | 6/2009 |
| KR | 10-2017-0053725 A | 5/2017 |
| TW | 201625378 A1 | 7/2016 |
| TW | 201711795 A | 4/2017 |
| WO | 2010004961 A | 1/2010 |
| WO | 2016056504 A1 | 4/2016 |
| WO | 2016194748 A1 | 12/2016 |

* cited by examiner

FIG.3

| $1 | $2 | $3 | $4 |
|---|---|---|---|
| G50 Z0 | | | |
| G630 | G630 | G630 | G630 |
| | G632 | G632 | G632 |
| M06 | | | |
| G00 Z-0.5 | | | |
| M03 S1=4000 G99 | M23 S2=4000 G99 | | |
| T0600 | | | |
| | | | |
| | T2200 | | |
| G00 X13.0 Z-0.5 | G00 X13.0 Z-1.0 | | |
| X-3.0 | X-30.0 | | |
| G01 Z2.5 F0.06 T06 | G01 Z2.5 F0.06 T22 | | |
| . | . | | |
| . | . | | |
| . | . | | |
| . | . | | |
| . | . | | |
| . | . | | |
| . | . | | |
| . | M72 | | |
| . | G04 U1.0 | | |
| . | M11 | | |
| . | M73 | | |
| . | M33 T2500 H4320 | | |
| . | | | |
| . | | | |
| . | | | |
| . | | | |
| . | | | |
| . | | | |
| N999 | N999 | N999 | N999 |
| M02 | M02 | M02 | M02 |
| M99 | M99 | M99 | M99 |
| % | % | % | % |

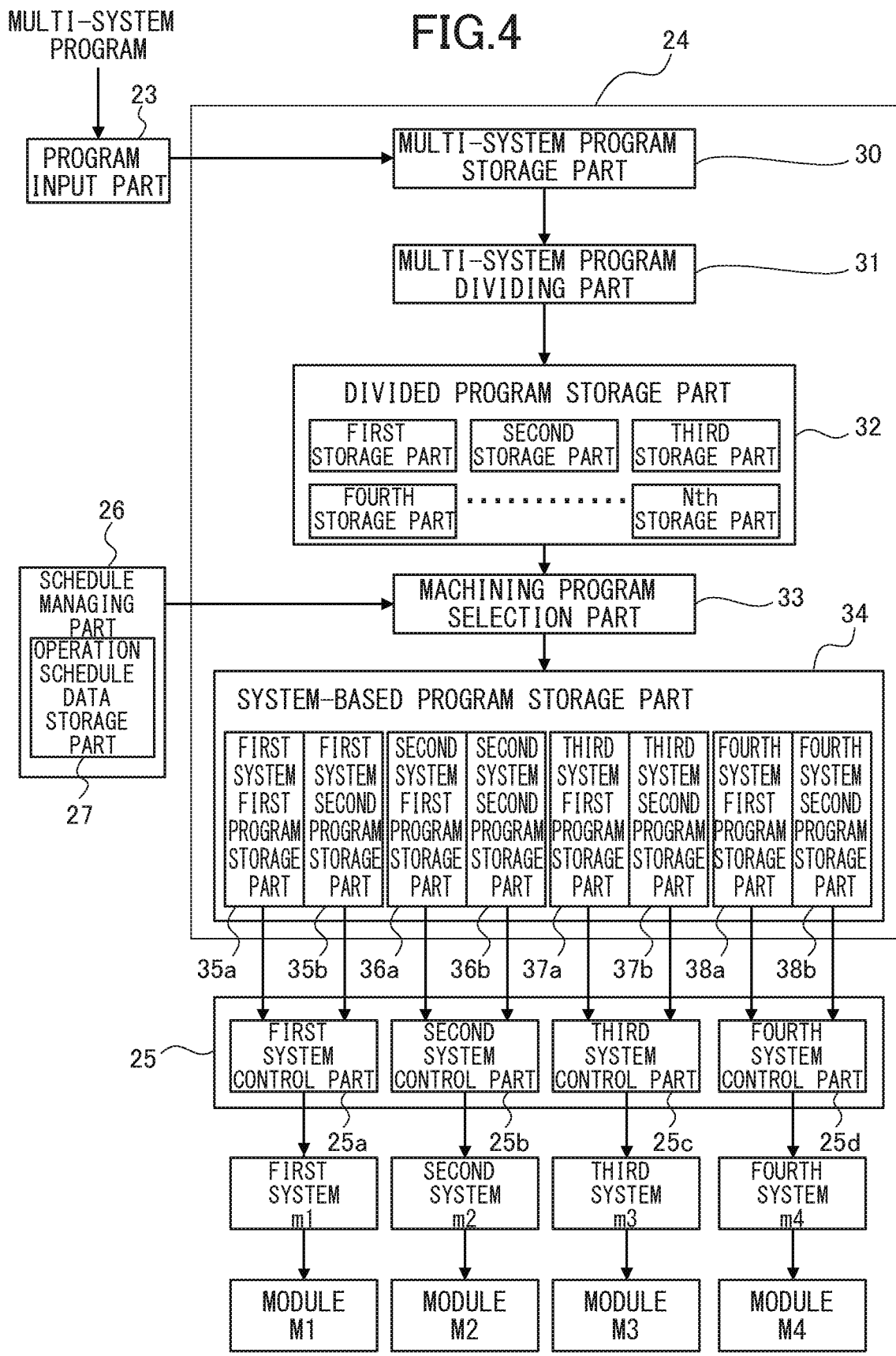

FIG.5A PRODUCT A
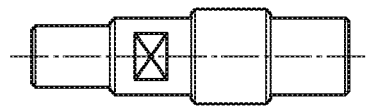
FIG.5B PRODUCT B
FIG.5C PRODUCT C
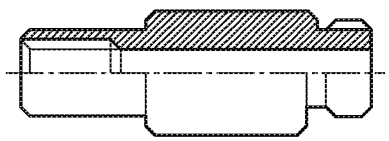
FIG.5D PRODUCT D
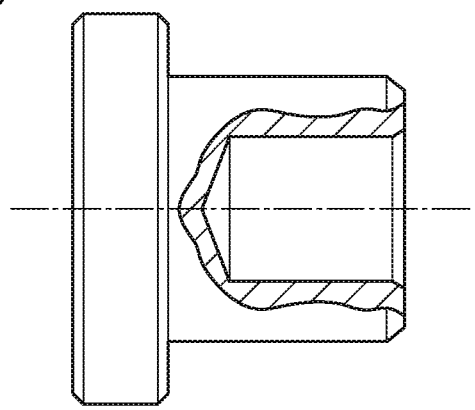
FIG.5E PRODUCT E

FIG.7

| WORKPIECE No. | Prg No. | STATE | PRODUCTION QUANTITY | COMPLETED PRODUCTION QUANTITY | FLOW | MODULE M1 MD1 CT SUPPLY | MODULE M1 MD1 CT MACHINING | MODULE M1 MD1 CT UNLOAD | MODULE M2 MD2 CT SUPPLY | MODULE M2 MD2 CT MACHINING | MODULE M2 MD2 CT UNLOAD | MODULE M3 MD3 CT SUPPLY | MODULE M3 MD3 CT MACHINING | MODULE M3 MD3 CT UNLOAD | MODULE M4 MD4 CT SUPPLY | MODULE M4 MD4 CT MACHINING | MODULE M4 MD4 CT UNLOAD | OVERALL CT |
|---|---|---|---|---|---|---|---|---|---|---|---|---|---|---|---|---|---|---|
| 1. | 100 | STOP | 2 | 0 | 1→2→3→4 | 5 | 15 | 2.5 | 2.5 | 15 | 2.5 | 2.5 | 15 | 2.5 | 2.5 | 15 | 5 | 77.5 |
| 2. | 200 | STOP | 2 | 0 | 1→2 | 5 | 30 | 2.5 | 2.5 | 15 | 5 | | | | | | | 57.5 |
| 3. | 300 | STOP | 5 | 0 | 3→4 | | | | | | | 5 | 20 | 2.5 | 2.5 | 15 | 5 | 47.5 |
| 4. | 400 | STOP | 2 | 0 | 1→2→3 | 5 | 15 | 2.5 | 2.5 | 20 | 2.5 | 5 | 10 | 5 | | | | 60 |
| 5. | 500 | NULL | 0 | 0 | 4 | | | | | | | | | | 5 | 15 | 5 | 25 |
| 6. | | | | | | | | | | | | | | | | | | |
| 7. | | | | | | | | | | | | | | | | | | |
| 8. | | | | | | | | | | | | | | | | | | |
| 9. | | | | | | | | | | | | | | | | | | |
| 10. | | | | | | | | | | | | | | | | | | |

CREATION

FIG.10

| WORKPIECE No. | Prg No. | STATE | PRODUCTION QUANTITY | COMPLETED PRODUCTION QUANTITY | FLOW | MD1 CT SUPPLY | MD1 CT MACHINING | MD1 CT UNLOAD | MD2 CT SUPPLY | MD2 CT MACHINING | MD2 CT UNLOAD | MD3 CT SUPPLY | MD3 CT MACHINING | MD3 CT UNLOAD | MD4 CT SUPPLY | MD4 CT MACHINING | MD4 CT UNLOAD | OVERALL CT |
|---|---|---|---|---|---|---|---|---|---|---|---|---|---|---|---|---|---|---|
| 1. | 100 | COMPLETED | 2 | 2 | 1→2→3→4 | 5 | 15 | 2.5 | 2.5 | 15 | 2.5 | 2.5 | 15 | 2.5 | 2.5 | 15 | 5 | 77.5 |
| 2. | 200 | OPERATING | 2 | 1 | 1→2 | 5 | 30 | 2.5 | 2.5 | 15 | 5 | | | | | | | 57.5 |
| 3. | 300 | OPERATING | 5 | 1 | 3→4 | | | | | | | 5 | 20 | 2.5 | 15 | 5 | 47.5 |
| 4. | 400 | WAITING | 2 | 0 | 1→2→3 | 5 | 15 | 2.5 | 2.5 | 20 | 2.5 | 2.5 | 10 | 5 | | | | 60 |
| 5. | 500 | NULL | 0 | 0 | 4 | | | | | | | | | | 5 | 15 | 5 | 25 |

| WORKPIECE No. | Prg No. | STATE | PRODUCTION QUANTITY | COMPLETED PRODUCTION QUANTITY | FLOW | MD1 CT SUPPLY | MD1 CT MACHINING | MD1 CT UNLOAD | MD2 CT SUPPLY | MD2 CT MACHINING | MD2 CT UNLOAD | MD3 CT SUPPLY | MD3 CT MACHINING | MD3 CT UNLOAD | MD4 CT SUPPLY | MD4 CT MACHINING | MD4 CT UNLOAD | OVERALL CT |
|---|---|---|---|---|---|---|---|---|---|---|---|---|---|---|---|---|---|---|
| 1. | 100 | COMPLETED | 2 | 2 | 1→2→3→4 | 5 | 15 | 2.5 | 2.5 | 15 | 2.5 | 2.5 | 15 | 2.5 | 2.5 | 15 | 5 | 77.5 |
| 2. | 200 | STOP | 2 | 1 | 1→2 | 5 | 30 | 2.5 | 2.5 | 15 | 5 | | | | | | | 57.5 |
| 3. | 300 | STOP | 5 | 1 | 3→4 | | | | | | | | | | 5 | 15 | 5 | 47.5 |
| 4. | 400 | STOP | 2 | 0 | 1→2→3 | 5 | 15 | 2.5 | 2.5 | 20 | 2.5 | 5 | 20 | 2.5 | | | | 60 |
| 5. | 500 | STOP | 3 | 0 | 4 | | | | | | | | 10 | 5 | 5 | 15 | 5 | 25 |

22a

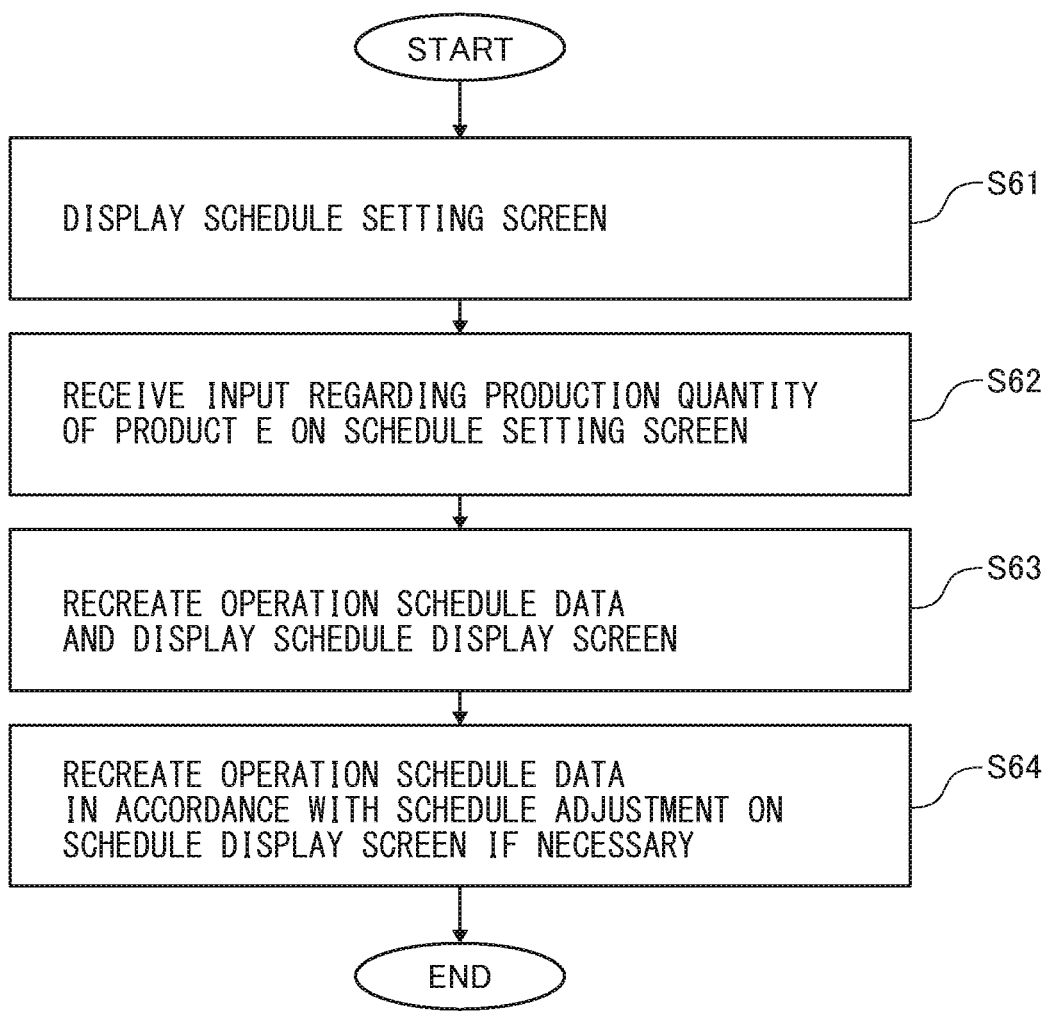

CONTROL DEVICE FOR MACHINE TOOL

CROSS-REFERENCE TO RELATED APPLICATION

This application is based upon and claims the benefit of priority from Japanese Patent Application No. 2017-068650 filed on Mar. 30, 2017, the entire disclosure of which are incorporated herein by reference.

TECHNICAL FIELD

The present disclosure relates to a control device for a machine tool which controls machining operation on a workpiece in accordance with a machining program.

BACKGROUND ART

A machine tool (a conventional workpiece machining apparatus) is provided with a plurality of modules (machining unit) each installed on a bed of the machine tool and including a main spindle for gripping a workpiece and a tool holder for holding a tool for machining the workpiece gripped by the main spindle. Such a conventional machine tool machines the workpiece while transferring the workpiece among the plurality of the modules (see Patent Literature 1: WO2010/004961 A1).

Further, a conventional control device includes a plurality of control systems for controlling a driving shaft of the machine tool and operates the machine tool by executing a multi-system program. Here, the multi-system program of the conventional control device includes a plurality of machining programs corresponding to the plurality of control systems respectively. With the conventional control device, therefore, each of the control systems is assigned to each of the modules, and each of the modules is controlled by execution of a machining program of the corresponding control system assigned to the module.

SUMMARY

The above-mentioned conventional machine tool can successively and efficiently produce, for example, the same-shaped products with a plurality of machining steps by machining the workpieces while transferring the workpieces among the plurality of modules.

For instance, when a product having a predetermined shape is produced by three machining steps using an automatic lathe having three modules; the first module may perform a first machining step with a machining program of a first system, the second module may perform a second machining step with a machining program of a second system, and the third module may perform a third machining step with a machining program of a third system to produce the product.

In this case, it is more efficient to successively produce the same-shaped products by performing the second machining step on the second product with the second module and the first machining step on the third product with the first module simultaneously while performing the third machining step on the first product with the third module after the first machining step and the second machining step on the first product are subsequently performed by the first module and the second machining modules.

However, the conventional control device is configured to replace the machining programs for the entire multi-system program. That is, in order to produce different-shaped products, such as a product A, a product B, and a product C each requiring a plurality (e.g., three) of machining steps, a different multi-system program is required for each product. Therefore, when the third machining step for the product A is being performed by the third module, it is unable to replace the multi-system program for the product A with a multi-system program for the product B or the product C.

In other words, when the third module is performing the third machining step for the product A, the second module is unable to perform the second machining step for the product B and the first module is unable to perform the first machining step for the product C. Hence, in order to produce different products (e.g., the product A, the product B, and the product C) sequentially and successively with the conventional control device for machine tool, it is necessary to wait for completion of the production of the product A performed by the first to third modules before replacing the multi-system program for the product A with the multi-system program for the product B and commencing the production of the product B using the first to third modules. Similarly, it is necessary to wait for completion of the production of the product B before replacing the multi-system program for the product B with the multi-system program for the product C and commencing the production of the product C using the first to third modules.

As explained above, the conventional control device has a drawback in which the operation downtime of a module may be prolonged and thus it becomes unable to efficiently produce a plurality of different-shaped products successively.

An object of this invention is, therefore, to provide a control device for a machine tool that can efficiently produce a plurality of different-shaped products successively.

To achieve the above object, a control device for a machine tool according to the present disclosure is provided. The machine tool includes a plurality of modules each integrally including a workpiece gripper that grips a workpiece and an operation-part holder that holds an operation part configured to perform a predetermined operation on the workpiece gripped by the workpiece gripper. The control device includes a plurality of control systems configured to control a driving shaft of the machine tool, the control device controlling the machine tool to machine the workpiece in accordance with a multi-system program, the multi-system program including a plurality of machining programs that respectively correspond to the control systems; a multi-system program storage part configured to store a plurality of the multi-system programs different from each other, the driving shaft of each of the modules being assigned to each of the control systems for each of the modules, and each of the plurality of multi-system programs being executed to machine the workpiece in a shape different from others; a multi-system program dividing part configured to divide each of the multi-system programs into the machining programs; a divided program storage part configured to individually store the divided machining programs; a system-based program storage part configured to store each of the machining programs corresponding to each of the control systems for each control system; and a machining program selection part configured to select a desired machining program from the divided program storage part in accordance with a machining step to be performed by each of the modules and to store the selected machining program in the system-based program storage part per predetermined one of the control systems. The system-based program storage part comprises a plurality of program storage parts for each of the control systems, and the system-based program storage part is configured so that a predetermined machining step is performed in each of the modules for each control system by sequentially referring to the machining programs stored in predetermined two of the program storage parts in each of the control systems. The machining program selection part is configured to replace the machining program stored in one of the two program storage parts while referring to the machining program stored in another of the two program storage parts when the machining program necessary for each of the control systems is selected from the divided program storage parts and stored in the system-based program storage part.

BRIEF DESCRIPTION OF DRAWINGS

FIG. 3 is a view for illustrating an example of a multi-system program containing machining programs recorded in recording areas $1, $2, $3, and $4.

FIG. 4 is a block diagram illustrating a program managing part of the control device.

FIG. 5A is a view illustrating an example of a product (product A) having a predetermined shape produced by the machine tool of the embodiment.

FIG. 5B is a view illustrating another example of a product (product B) having a predetermined shape produced by the machine tool of the embodiment.

FIG. 5C is a view illustrating another example of a product (product C) having a predetermined shape produced by the machine tool of the embodiment.

FIG. 5D is a view illustrating another example of a product (product D) having a predetermined shape produced by the machine tool of the embodiment.

FIG. 5E is a view illustrating another example of a product (product E) having a predetermined shape produced by the machine tool of the embodiment.

FIG. 7 is a view illustrating an example of a schedule setting screen in the machining example.

FIG. 10 is a view illustrating an example of the schedule setting screen during the execution of the machining programs.

FIG. 12 is a view illustrating an example of the schedule setting screen during an interrupt operation.

FIG. 15 is a flowchart showing a schedule adjustment control by the control device during the interrupt operation.

DETAILED DESCRIPTION

Figure 1:
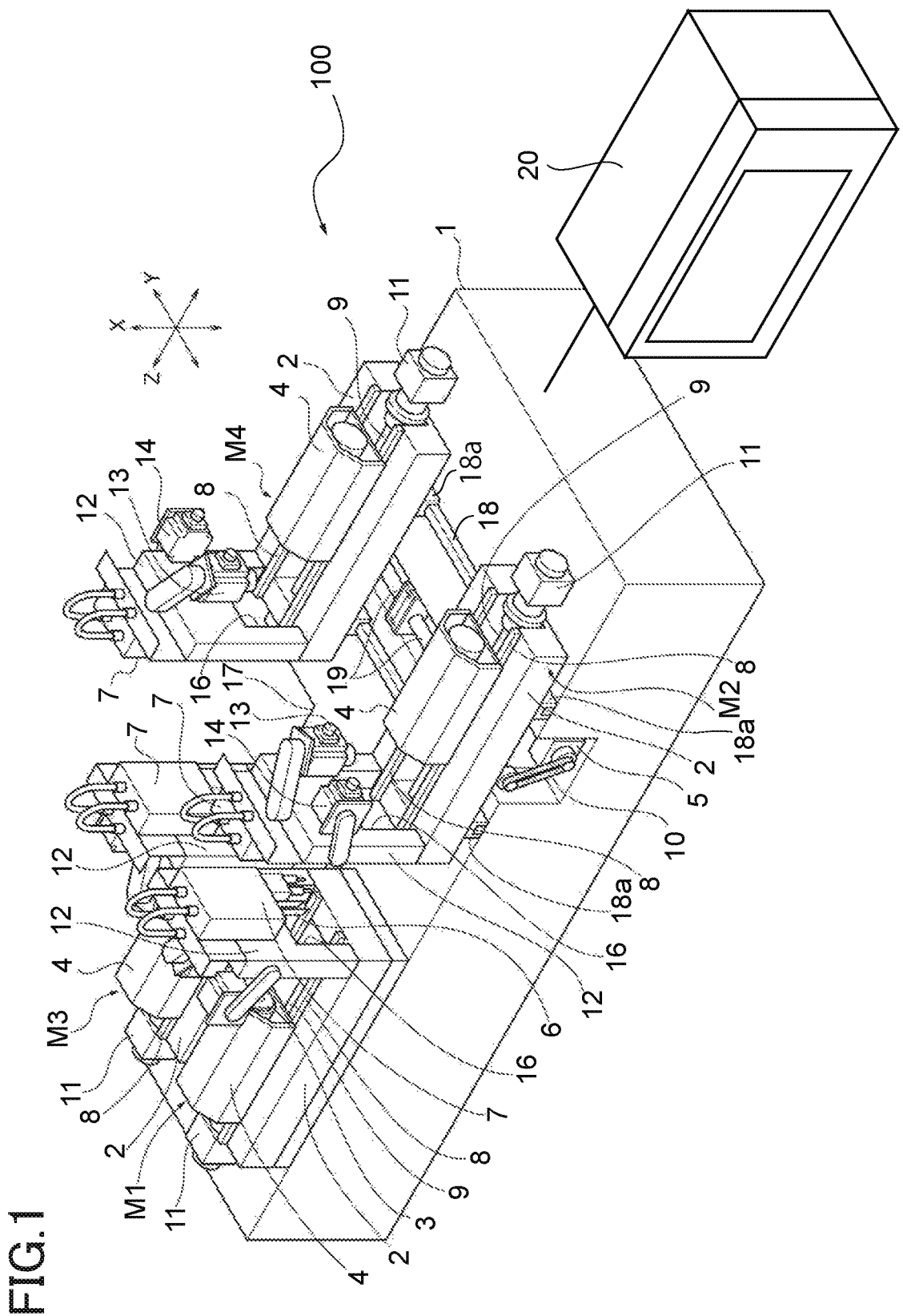
FIG. 1 is a perspective view illustrating an overall configuration of a machine tool that includes a control device according to an embodiment of the present disclosure.

As illustrated in FIG. 1, a machine tool (automatic lathe) 100 includes a control device according to an embodiment of the present disclosure. The machine tool 100 includes a bed 1 on which four modules M1, M2, M3, and M4 are installed as machining units.

Hereinafter, the axial directions of the main spindles 3 of the modules M1, M2, M3, and M4 represent a Z-axial direction. Further, a direction orthogonal to the Z-axis direction in the horizontal direction represents a Y-axis direction, and a direction orthogonal to both the Z-axis and the Y-axis represents an X-axis direction.

The basic configurations of the modules M1, M2, M3, and M4 are identical to each other. That is, each of the modules M1, M2, M3, and M4 is integrally provided on a base plate 2 with a spindle headstock 4 that supports a main spindle 3 and a tool post 7 that holds tools 6 to machine a workpiece gripped by the main spindle 3.

A known built-in motor is installed between the main spindle 3 and the spindle headstock 4. The built-in motor as a drive portion rotates the main spindle 3 about the axis thereof. The main spindle 3 removably grips the workpiece by opening and closing a main spindle chuck at a front end portion thereof. Two guiderails 8 are disposed on each of the base plates 2. The guiderails 8 extend in the Z-axis direction and are arranged in parallel to the Y-axis direction.

Each of the spindle headstocks 4 is slidably disposed on the guiderails 8. The spindle headstock 4 is screwed to a ball screw 9 which is installed between the guiderails 8. A motor 11 for the ball screw 9 drives the spindle headstock 4 as a drive portion to move with the main spindle 3 on the guiderails 8 in the Z-axis direction. In front of the spindle headstock 4, a support table 12 is fixedly disposed on the base plate 2.

The tool post 7 is installed at the front side of the support tables 12 so as to be movable in the X-axis direction and the Y-axis direction. The tool post 7 is moved in the X-axis direction and the Y-axis direction by the corresponding X-axis motor 13 and the corresponding Y-axis motor 14 which are the drive portions. Each of the support tables 12 is formed in a gate shape with an opening 16. The spindle headstock 4 may pass through the opening 16. Passing through the opening 16, the spindle headstock 4 may position the workpiece gripped by the main spindle 3 to face the corresponding tool post 7.

The bed 1 includes a notch 17 by which a corner of the bed 1 is cut into a concave shape so that the bed 1 has a substantially L shape in a plan view. The two modules M1 and M3 are disposed on the bed 1 and arranged parallel to each other along the Z-axis direction. The base plates 2 of the two modules M1 and M3 are fixed to the bed 1.

In positions opposing to the modules M1 and M3, two guide rails 18 are disposed on the bed 1 and arranged in the Z-axis direction. The guide rails 18 extend in the Y-axis direction from a side facing the module M1 to a side facing the notch 17. Each of the guide rails 18 includes sliders 18*a* slidably attached thereto.

The base plates 2 of the two modules M2 and M4 are fixed on the sliders 18*a* of the guide rails 18. The two modules M2 and M4 on the guide rails 18 are arranged in the Y-axis direction in parallel to each other along the Z-axis direction. According to the above configurations, the modules M1, M2, M3, and M4 can be arranged in parallel to each other in the Z-axis direction. The modules M2 and M4 are disposed to be reciprocally movable along the guide rails 18.

Ball screws 19, 19 for the modules M2 and M4 are coaxially disposed between the guide rails 18 and arranged in parallel to the guide rails 18. The ball screws 19, 19 are screwed to the base plates 2 of the modules M2 and M4, respectively. Each of the ball screws 19, 19 is in connection with each of driving motors 5 as the drive portions which are disposed on the bed 1. Each of the ball screws 19, 19 is connected to each of the corresponding driving motors 5 via a belt 10.

By rotabaly driving the respective driving motors 5, the modules M2 and M4 independently and reciprocally move in the Y-axis direction along the guide rails 18. Hereinafter, the modules M2 and M4 installed on the guide rails 18 are referred to as "the moving modules" and the modules M1 and M3 fixed on the bed 1 are referred to as "the fixed modules".

The fixed module M3 is disposed along the edge of the bed 1 adjacent to the notch 17. The fixed module M1 is disposed along the edge of the bed 1 on the opposite side of the notch 17 with the fixed module M3 interposed therebetween. The moving module M4 is movable to face the notch 17. Accordingly, the moving module M2 can move to positions where the moving module M2 faces the fixed modules M1 and M3 respectively and the axis of its main spindle coincides with the respective axes of the main spindles of the fixed modules M1 and M3 in a straight line.

Moving the moving module M2 to face the fixed module M1, the moving module M4 can move to a position where the moving module M4 faces the fixed module M3 and the axis of the main spindle of the moving module M4 coincides with the axis of the main spindle of the fixed module M3. The movement of the modules M1 to M4 and the drive portions including the driving motors 5 for the ball screws 19 is controlled by a control device 20.

In each of the modules M1, M2, M3, and M4 while the main spindle 3 grips the workpiece, under the control of the control device 20, each of the drive portions controls the rotation of the main spindle 3, the movement of the spindle headstock 4 in the Z-axis direction, and the movement of the tool post 7 in the X-axis direction and the Y-axis direction. Thereby, the workpiece can be machined into a predetermined shape by selecting desired tools on the tool post.

The moving modules M2 and M4 are moved to positions where the respective moving modules face the fixed module M1 or the fixed module M3 and the axes of the main spindles of the moving and fixed modules coincide with each other, and the spindle headstocks 4 of the moving and fixed modules are moved to approach each other. Thereby, the workpiece can be transferred between the moving modules M2 and M4 and the fixed modules M1 and M3.

The machine tool 100 is configured by combining the modules M1, M2, M3, and M4 each of which functions as an independent lathe. In the machine tool 100, the control device 20 controls machining operation of the workpieces at the modules M1, M2, M3, and M4 which successively transfer the workpieces.

In the embodiment, a workpiece gripper for holding the workpiece in each of the modules M1, M2, M3, and M4 consists of the main spindle 3 for gripping the workpiece. An operation part that performs a predetermined operation on the workpiece gripped by the workpiece gripper consists of the tools 6 for machining the workpiece gripped by the main spindle 3. An operation-part holder that holds the operation part consists of the tool post 7 for holding the tools 6. In other words, the machine tool according to the embodiment includes the modules M1, M2, M3, and M4 which are the lathe modules. However, the modules are not limited to the lathe modules, but the machine tool may include machining modules for grinding, milling, gear cutting, or the like.

Figure 2:
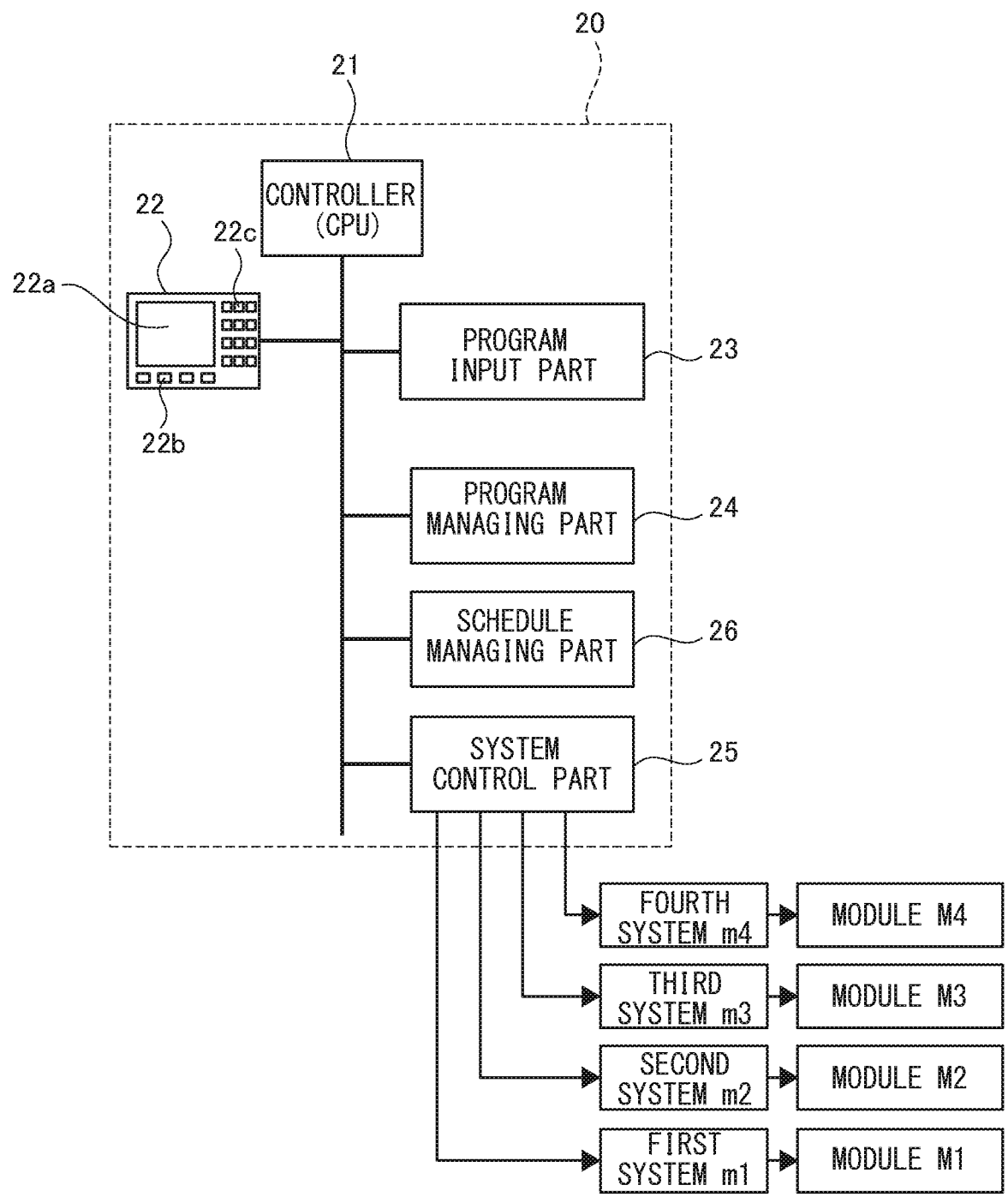
FIG. 2 is a block diagram illustrating the control device for a machine tool according to the embodiment of the present disclosure.

The machine tool 100 includes the control device 20 which controls the machine tool 100. As shown in FIG. 2, the control device 20 includes a controller (CPU) 21, an operation panel 22, a program input part 23, a program managing part 24, a system control part 25, and a schedule managing part 26. Operations of the program input part 23, the program managing part 24, the system control part 25, the schedule managing part 26 and the like are performed by programs stored in the control device 20 and/or hardware installed in the control device 20 (i.e. by software or hardware).

The control device 20 of this embodiment includes four control systems (a first system m1, a second system m2, a third system m3, and a fourth system m4). A driving shaft of each of the modules M1, M2, M3, and M4 is independently assigned to each of the control systems. Each of the modules M1, M2, M3, and M4 is controlled by the control device 20 based on a multi-system program stored (recorded) in the program managing part 24.

The multi-system program can be a workpiece machining program including a plurality of machining programs corresponding to predetermined ones of the control systems (i.e., the first system m1, the second system m2, the third system m3, and the fourth system m4). The multi-system program of this embodiment includes four recording areas $1, $2, $3, and $4. Each of the recording areas $1, $2, $3, and $4 records the machining program for the corresponding system. As shown in FIG. 3, the multi-system program is formed as a single workpiece machining program which includes the four recording areas $1, $2, $3, and $4 arranged in parallel or in series.

The recording area $1 records a machining program corresponding to the first system m1. The recording area $2 records a machining program corresponding to the second system m2. The recording area $3 records a machining program corresponding to the third system m3. The recording area $4 records a machining program corresponding to the fourth system m4. It should be noted that the multi-system program may be configured by connecting and associating the plurality of the recorded machining programs in accordance with a predetermined associating manner or the like. In this case, each of the machining programs of the recording areas $1, $2, $3, and $4 is recorded in each of the connected machining programs.

The controller 21 independently controls each of the control systems (i.e., the first system m1, the second system m2, the third system m3, and the fourth system m4) corresponding to each of the machining programs contained in the multi-system program via the system control part 25.

In this embodiment, the driving shafts of the module M1 are assigned to the first system m1. The driving shafts of the module M2, which includes the driving motor 5 for the ball screw 19, are assigned to the second system m2. The driving shafts of the module M3 are assigned to the third system m3. The driving shafts of the module M4, which includes the driving motor 5 for the ball screw 19, are assigned to the fourth system m4.

Accordingly, the controller 21 controls the module M1 by the first system m1. The controller 21 controls the module M2 by the second system m2, for example, to move the module M2 in the Y-axis direction. The controller 21 controls the module M3 by the third system m3. The controller 21 controls the module M4 by the fourth system m4, for example, to move the module M4 in the Y-axis direction. With this, the controller 21 controls the entire operation of the machine tool 100 and the workpiece-machining operation by the modules M1, M2, M3, and M4.

As shown in FIG. 2, the operation panel 22 includes a display 22a, operation buttons 22b, a keyboard 22c, and the like. The display 22a displays, for example, the operational status of the machine tool 100 and operational commands to the machine tool 100. The operation buttons 22b and the keyboard 22c are used to input desired operations.

As shown in FIG. 4, the program managing part 24 includes a multi-system program storage part 30, a multi-system program dividing part 31, a divided program storage part 32, a machining program selection part 33, and a system-based program storage part 34.

The multi-system program is programmed via an external computer and/or the operation panel 22 and stored (recorded) in the multi-system program storage part 30 through the program input part 23. For example, the multi-system program may include machining programs for the control systems (i.e. the first system m1, the second system m2, the third system m3, and the fourth system m4) controlling the corresponding modules M1, M2, M3, and M4 so as to complete producing a desired product having a predetermined shape from a predetermined material (workpiece) with the first machining step by the module M1, the second machining step by the module M2, the third machining step by the module M3, and the fourth machining step by the module M4.

The multi-system program dividing part 31 is configured such that the divided program storage part 32 stores (records) the multi-system program stored in the multi-system program storage part 30 for each of the machining programs consisting of the multi-system program. For example, the multi-system program is divided into machining programs for each of the recording areas $1, $2, $3, and $4, and the divided machining programs are individually stored (recorded) in the divided program storage part 32.

The divided program storage part 32 includes first to nth storage parts. Each of the storage parts stores a machining program contained in the divided multi-system and/or a machining program contained in the single-system program for producing a predetermined product with a single machining step by a predetermined module. Accordingly, each of the storage parts stores the corresponding machining program.

When a different multi-system program is input to the multi-system program storage part 30 through the program input part 23, the program managing part 24 sends the inputted multi-system program to the multi-system program dividing part 31. By sequentially storing (recording) the different multi-system programs for producing different products from the workpiece in the multi-system program storage part 30, the machining programs of each of different multi-system programs are individually stored in the divided program storage part 32 through the multi-system program dividing part 31.

For example, the multi-system program storage part 30 stores the multi-system program MP1 (see FIG. 6A) for producing a product A as shown in FIG. 5A by the four steps (i.e. the first machining step, the second machining step, the third machining step, and the fourth machining step). Accordingly, the first storage part stores a machining program PA1 for the first system m1 recorded in the recording area $1 of the multi-system program MP1. The second storage part stores a machining program PA2 for the second system m2 recorded in the recording area $2. The third storage part stores a machining program PA3 for the third system m3 recorded in the recording area $3. The fourth storage part stores a machining program PA4 for the fourth system m4 recorded in the recording area $4.

Similarly, the multi-system program storage part 30 stores the multi-system program MP2 (see FIG. 6B) for producing a product B as shown in FIG. 5B by the two steps (i.e. the first machining step and the second machining step). Accordingly, the fifth storage part stores a machining program PB1 for the first system m1 recorded in the recording area $1 of the multi-system program MP2. Further, the sixth storage part stores a machining program PB2 for the second system m2 recorded in the recording area $2.

Further, the multi-system program storage part 30 stores the multi-system program MP3 (see FIG. 6C) for producing a product C as shown in FIG. 5C by the two steps including the first machining step by the module M3 and the second machining step by the module M4. Accordingly, the seventh storage part stores a machining program PC1 for the third system m3 recorded in the recording area $3 of the multi-system program MP3. Further, the eighth storage part stores a machining program PC2 for the fourth system m4 recorded in the recording area $4.

In addition, the multi-system program storage part 30 stores the multi-system program MP4 (see FIG. 6D) for producing a product D as shown in FIG. 5D by the three steps (i.e. the first machining step, the second machining step, and the third machining step). Accordingly, the ninth storage part stores a machining program PD1 for the first system m1 recorded in the recording area $1 of the multi-system program MP4. Further, the tenth storage part stores a machining program PD2 for the second system m2 recorded in the recording area $2. Moreover, the eleventh storage part stores a machining program PD3 for the third system m3 recorded in the recording area $4.

Also, the multi-system program storage part 30 is capable of storing the single-system program. The multi-system program storage part 30 stores the single-system program MP5 (see FIG. 6E) for producing a product E as shown in FIG. 5E with one machining step by the module M4. Accordingly, the multi-system program dividing part 31 stores in the twelfth storage part a machining program PE1 for the fourth system m4 recorded in the recording area $4 of the single-system program MP5.

The schedule managing part 26 is configured to create and manage operation schedule data of the machine tool 100. The schedule managing part 26 includes an operation schedule data storage part 27 which stores (records) the created operation schedule data. The operation schedule data contains information defining the execution order of the machining programs to be executed for control systems. The control device 20 sequentially executes the machining programs in the control systems based on the operation schedule data. The workpiece machining operations in the modules M1, M2, M3, and M4 are performed in the execution order of the machining programs based on the operation schedule data.

With the execution of each machining program, the control device 20 measures time for each step by each machining program (hereinafter referred to as "measured value"). In order to facilitate acquisition of the measured values, it is preferable to set in advance commands (codes) for start and stop of the measurements at the beginning and end of a group of commands for each of the processes (supplying, machining, and unloading). However, the above commands may not necessarily be set, but the control device 20 may detect the timing of start and end for each of the processes by analyzing the machining programs or the like to acquire the measured values.

The schedule managing part 26 displays a schedule setting screen as shown in FIG. 7 on the display 22a. The schedule setting screen includes items such as production quantity, machining flow, supplying (loading) time, machining time, takeout (unloading) time for each workpiece at the modules M1 to M4 for each product to be produced. The workpiece numbers 1, 2, 3, 4, and 5 shown in FIG. 7 respectively represent identification numbers for workpieces corresponding to the product A, the product B, the product C, the product D, and the product E, for example.

The operator (user) may manually input data corresponding to the items on the schedule setting screen. By analyzing each of the multi-system programs stored in the multi-system program storage part 30, and calculating supplying time, machining time, unloading time and machining flow for each product, the schedule managing part 26 may automatically display the calculated supplying time, machining time, unloading time, and machining flow on the schedule setting screen. Also, the operator may input production quantity on the schedule setting screen.

In the initial state before the machine tool 100 starts the first machining in accordance with the operation schedule data, time the operator manually inputs or time the schedule managing part 26 automatically calculates by the program analysis (referred to as "initial value" hereinafter) is displayed as the supplying time, the machining time, and the unloading time for each machining program on the schedule setting screen. When the schedule setting screen is displayed after the execution of the machining in the machine tool 100, the supplying time, the machining time, and the unloading time are displayed as the measured values measured by the control device 20.

The state (status) of the machining in each of the modules M1 to M4 can be displayed in real time in the column of "state" on the schedule setting screen. For example, "OPERATING" is displayed during machining; "COMPLETED" is displayed when the machining is completed; and "STOP" is displayed when the operation is stopped. "NULL" indicates that a product is not produced.

Figure 8:
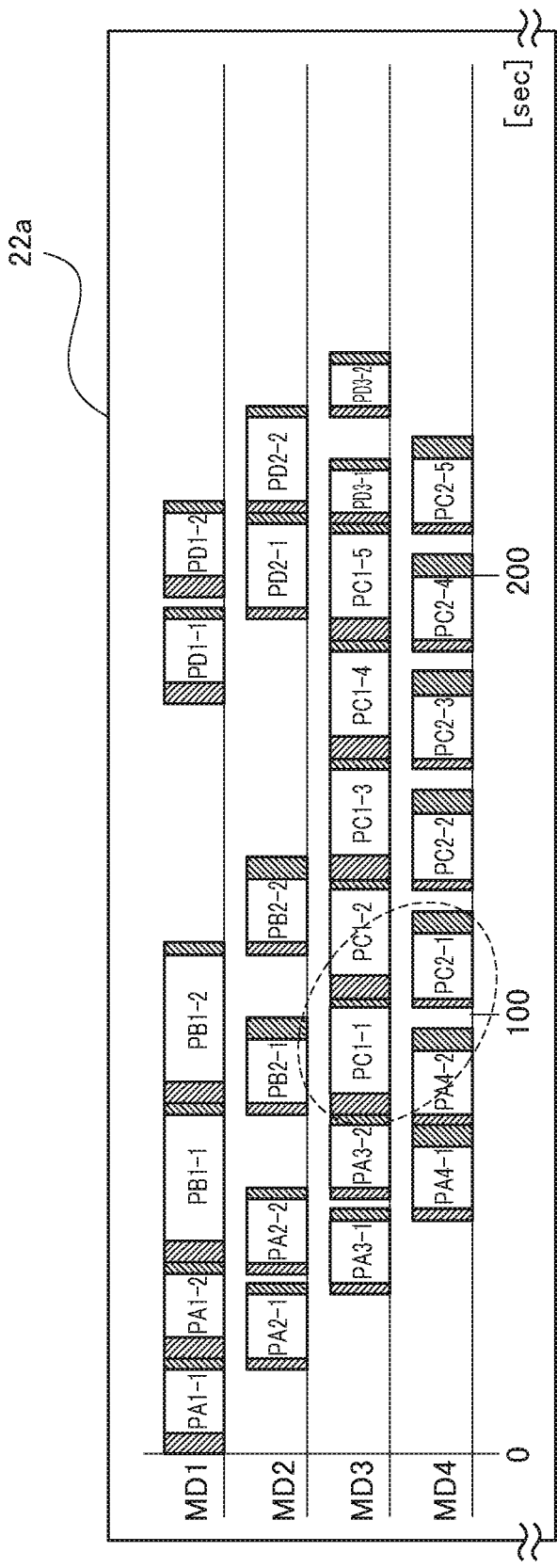
FIG. 8 is a view illustrating an example of a schedule display screen in the machining example.

The schedule managing part 26 creates the operation schedule data based on a predetermined algorithm in accordance with initial values input on the schedule setting screen or by the program analysis, or the measured values. A schedule display screen is displayed on the display 22a as shown in FIG. 8 based on the created operation schedule data. The operator can visually recognize the operation schedule of the machine tool 100 by visually checking the schedule display screen.

Each of MD1, MD2, MD3, and MD4 shown in FIG. 8 indicates the schedule of the machining program executed in each of the modules M1, M2, M3, and M4. The hatched portions attached to front and rear sides of each machining program indicate the supplying time and the unloading time, respectively. A portion between the supplying time and the unloading time represents the machining time. In each of the machining programs, the number added to the ID of the machining program (for example "PA1", "PA2", etc.) represents the product number. For example, "PA1-1" represents the machining program of the first machining step for the first product A.

Also in the schedule display screen, in the initial state before the machine tool 100 starts the first machining, the supplying time, the machining time, and the unloading time are displayed based on the initial values by the program analysis or the like. In addition, when the schedule display screen is displayed after the execution of the machining in the machine tool 100, the supplying time, the machining time, and the unloading time are displayed based on the measured values measured by the control device 20.

Further, in the embodiment, it is possible to adjust the schedule, for example, by changing the order of the machining programs of the operation schedule data on the schedule display screen. The schedule may be adjusted on the schedule display screen on which the initial values before staring the machining are displayed or on the schedule display screen on which the measured values after the execution of the machining are displayed. In the example shown in FIG. 8, idle time having a predetermined time or more exists between the start of the machining programs and the actual start of the machining programs in the modules M3 and M4. The idle time may have already existed on the schedule display screen in the initial state or may be generated when the actual values are reflected by the execution of the machining.

The operator may manually adjust the schedule by using the idle time to perform the machining step for any of the workpieces. For example, the schedule may be adjusted such that the first machining step for the first product C in the module M3, which is shorter than the idle time, is performed before the third machining step for the first product A, and the second machining step for the product C in the module M4 is performed before the fourth machining step for the product A.

Specifically, the operator respectively moves the machining programs PC1-1 and PC2-1 for the product C surrounded by a circle in FIG. 8 to forward of the machining programs PA3-1 and PA4-1 for the product A by drag and drop operations with a mouse.

Figure 9:
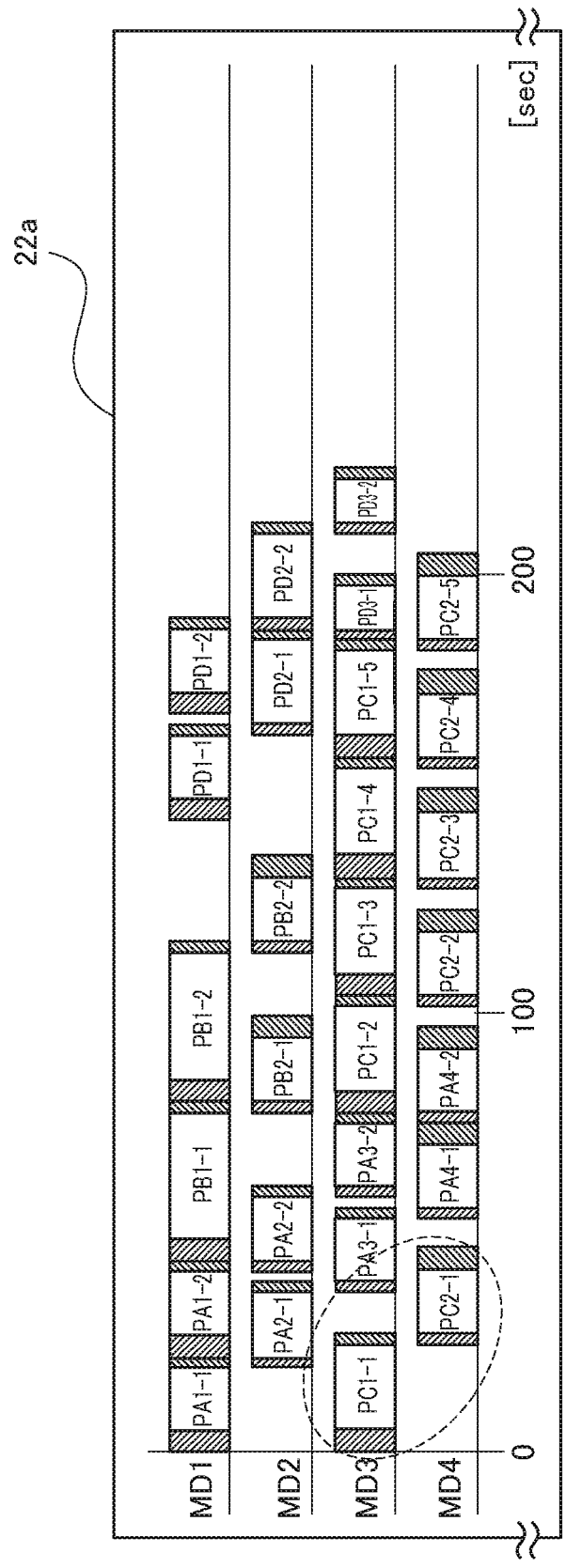
FIG. 9 is a view illustrating an example of the schedule display screen after an operation schedule data adjustment.

According to the above movement, the first and second machining steps performed in the modules M3 and M4 for the second and subsequent products C and the first to third machining steps for the two products D can be moved forward. Accordingly, these steps can be started earlier. FIG. 9 shows the schedule display screen after the schedule adjustment. The schedule adjustment can reduce the idle time when the modules M1 to M4 do not perform machining, and easily shorten the overall operating time of the machine tool 100. The schedule managing part 26 recreates (updates) the operation schedule data according to the display of the schedule display screen.

The machining program selection part 33 selects a storage part in which a predetermined machining program is stored from the first to $n^{th}$ storage parts in the divided program storage part 32 in cooperation with the schedule managing part 26. This selection is performed in accordance with the machining step in each of the modules M1, M2, M3, and M4 based on the operation schedule data created by the schedule managing part 26. In other words, the selection is performed in accordance with the execution order of the machining programs. The machining program selection part 33 is configured so that the system-based program storage part 34 stores (records) the machining program stored in the selected storage part for each control system.

The system-based program storage part 34 according to the embodiment includes eight program storage parts corresponding to the four control systems (the first system m1, the second system m2, the third system m3, and the fourth system m4). The system-based program storage part 34 includes a first system first program storage part 35*a* and a first system second program storage part 35*b* as program storage parts which store the machining programs for the first system m1. The system-based program storage part 34 includes a second system first program storage part 36*a* and a second system second program storage part 36*b* as program storage parts which store the machining programs for the second system m2. The system-based program storage part 34 includes a third system first program storage part 37*a* and a third system second program storage part 37*b* as program storage parts which store the machining programs for the third system m3. The system-based program storage part 34 includes a fourth system first program storage part 38*a* and a fourth system second program storage part 38*b* as program storage parts which store the machining programs for the fourth system m4.

With the above configuration, the system-based program storage part 34 includes the two program storage parts, i.e. the first program storage part and the second program storage part for each control system. The machining programs for each control system selected in the machining program selection part 33 are respectively stored in the first program storage part and the second program storage part for each control system.

The system control part 25 in the embodiment includes the four system control parts (i.e. the first system control part 25*a*, the second system control part 25*b*, the third system control part 25*c*, and the fourth system control part 25*d*). Each of the system control parts corresponds to each of the four control systems (the first system m1, the second system m2, the third system m3, and the fourth system m4) and independently controls the corresponding control system.

The fist, second, third and fourth system control parts 25*a*, 25*b*, 25*c*, and 25*d* independently control drive shafts assigned to each of the control systems (the first system m1, the second system m2, the third system m3, and the fourth system m4) based on the machining programs respectively stored in the corresponding system-based program storage part 34 (the first system first and second program storage parts 35*a*, 35*b*, the second system first and second program storage parts 36*a*, 36*b*, the third system first and second program storage parts 37*a*, 37*b*, and the fourth system first and second program storage parts 38*a*, 38*b*). In this embodiment, the first system control part 25*a* independently controls the module M1. The second system control part 25*b* independently controls the module M2. The third system control part 25*c* independently controls the module M3. The fourth system control part 25*d* independently controls the module M4.

In the embodiment, each of the system control parts 25*a*, 25*b*, 25*c*, and 25*d* alternately refers to and loads the machining programs stored in the first program storage part and the second program storage part, and executes the stored machining programs. The first system control part 25*a* controls the module M1 based on the machining program stored in the first system first program storage part 35*a*, and then repeatedly controls the module M1 based on the machining program stored in the first system second program storage part 35*b*.

Similarly, the second system control part 25*b* alternately refers to and loads the machining program stored in the second system first program storage part 36*a* and the machining program stored in the second system second program storage part 36*b*, and controls the module M2. The third system control part 25*c* alternately refers to and loads the machining program stored in the third system first program storage part 37*a* and the machining program stored in the third system second program storage part 37*b*, and controls the module M3. The fourth system control part 25*d* alternately refers to and loads the machining program stored in the fourth system first program storage part 38*a* and the machining program stored in the fourth system second program storage part 38*b*, and controls the module M4.

In accordance with the operation schedule data, the machining program selection part 33 instructs the first program storage part and the second program storage part corresponding to the respective control systems to sequentially replace the machining programs and store them. The machining program selection part 33 replaces the machining programs as follows. The machining program in the first program storage part is replaced while the machining program stored in the second program storage part for the corresponding control system is being referred to and loaded. The machining program in the second program storage part is replaced while the machining program stored in the first program storage part is being referred to and loaded.

As mentioned above, the machining program selection part 33 replaces the machining program stored in one of the program storage parts while referring to the machining program stored in the other of the program storage parts. Thereby, based on the operation schedule data, the first system first program storage part 35*a* and the first system second program storage part 35*b* in order store the respective machining programs corresponding to the first system m1 selected from the divided program storage part 32 by the machining program selection part 33.

For example, with regard to the operation schedule data based on the schedule display screen shown in FIG. 9, the first system first program storage part 35*a* stores the machining program PA1-1 and the first system second program storage part 35*b* stores the machining program PA1-2 in the first system m1. Then, the first system control part 25*a* of the first system m1 refers to the first system first program storage part 35*a* and executes the machining program PA1-1. Next, while the first system control part 25*a* is referring to the first system second program storage part 35*b* and executing the machining program PA1-2, the machining program selection part 33 replaces the machining program PA1-1 in the first system first program storage part 35*a* with the machining program PB1-1. Subsequently, while the first system control part 25*a* is referring to the first system first program storage part 35*a* and executing the machining program PB1-1, the machining program selection part 33 replaces the machining program PA1-2 in the first system second program storage part 35*b* with the machining program PB1-2.

Next, while the first system control part 25*a* is referring to the first system second program storage part 35*b* and executing the machining program PB1-2, the machining program selection part 33 replaces the machining program PB1-1 in the first system first program storage part 35*a* with the machining program PD1-1. Then, while the first system control part 25*a* is referring to the first system first program storage part 35*a* and executing the machining program PD1-1, the machining program selection part 33 replaces the machining program PB1-2 in the first system second program storage part 35*b* with the machining program PD1-2. In other words, the module M1 is controlled by alternately referring to the machining program in the first system first program storage part 35*a* and the machining program in the first system second program storage part 35*b* which are sequentially replaced by the machining program selection part 33.

Also in the second system m2, the machining program selection part 33 replaces the machining program stored in one of the program storage parts while referring to the machining program stored in the other of the program storage parts. Thereby, as in the first system, based on the operation schedule data, the second system first program storage part 36*a* and the second system second program storage part 36*b* alternately store the respective machining programs corresponding to the second system m2 selected from the divided program storage part 32 by the machining program selection part 33 in the order of the machining steps in the second system m2.

In the example shown in FIG. 9, when the second system control part 25*b* of the second system m2 refers to and loads the machining program stored in one of the program storage parts but does not refer (execute) the machining program stored in the other of the program storage parts, the machining program selection part 33 replaces the machining program in the other of the program storage parts. Specifically, the machining program in the second system first program storage part 36*a* is replaced with the machining programs PA2-1, PB2-1 and PD2-1 in this order. The machining program in the second system second program storage part 36*b* is replaced with the machining program PA2-2, PB2-2 and PD2-2 in this order.

Also in the third system m3, the machining program selection part 33 replaces the machining program stored in one of the program storage parts while referring to the machining program in the other of the program storage parts. Thereby, based on the operation schedule data, the third system first program storage part 37*a* and the third system second program storage part 37*b* alternately store the machining programs corresponding to the third system m3 selected from the divided program storage part 32 by the machining program selection part 33 in the order of the machining steps in the third system m3.

In the example of FIG. 9, when the third system control part 25*c* of the third system m3 refers to and loads the machining program stored in one of the program storage parts but does not refer (execute) the machining program stored in the other of the program storage parts, the machining program selection part 33 replaces the machining program in the other of the program storage parts. Specifically, the machining program in the third system first program storage part 37*a* is replaced with the machining program PC1-1, PA3-2, PC1-3, PC1-5 and PD3-2 in this order. The machining program in the third system second program storage part 37*b* is replaced with the machining program PA3-1, PC1-2, PC1-4 and PD3-1 in this order.

Also in the fourth system m4, the machining program selection part 33 replaces the machining program stored in one of the program storage parts while referring to the machining program in the other of the program storage parts. Thereby, based on the operation schedule data, the fourth system first program storage part 38*a* and the fourth system second program storage part 38*b* alternately store the machining programs corresponding to the fourth system m4 selected from the divided program storage part 32 by the machining program selection part 33 in the order of the machining steps in the fourth system m4.

In the example of FIG. 9, when the fourth system control part 25*d* of the fourth system m4 refers to and loads the machining program stored in one of the program storage parts but does not refer to (execute) the machining program stored in the other of the program storage parts, the machining program selection part 33 replaces the machining program in the other of the program storage parts. Specifically, the machining program in the fourth system first program storage part 38*a* is replaced with the machining program PC2-1, PA4-2, PC2-3 and PC2-5 in this order. The machining program in the fourth system second program storage part 38*b* is replaced with the machining program PA4-1, PC2-2 and PC2-4 in this order.

The machining program selection part 33 replaces the machining programs in the first program storage part and the second program storage part of the corresponding control systems while the machining programs are not referred in the corresponding control systems. In other words, while the machining program stored in one of the program storage parts is being executed, the machining program in the other of the storage parts is replaced with the machining program to be executed next. Similarly, while the machining program in the other of the storage parts is being referred, the machining program in one of the program storage parts is replaced. Thereby, after the execution of the machining program in one or the other of the program storage parts in the corresponding control systems, the machining program in one or the other of the program storage parts can be referred to and executed continuously. Accordingly, time loss due to the replacement of the programs can be eliminated and the machining program can be effectively executed in each of the control systems.

EXAMPLE

Hereinafter, as an example of machining by the machine tool 100, an example in the case of continuously machining a plurality of different products will be described. In this example, as shown in FIGS. 5A to 5E, the product A, the product B, the product C, the product D, and the product, E each having a different shape from others are produced from the predetermined material (workpiece) by the modules M1 to M4 with one workpiece machining program.

Figure 6A:
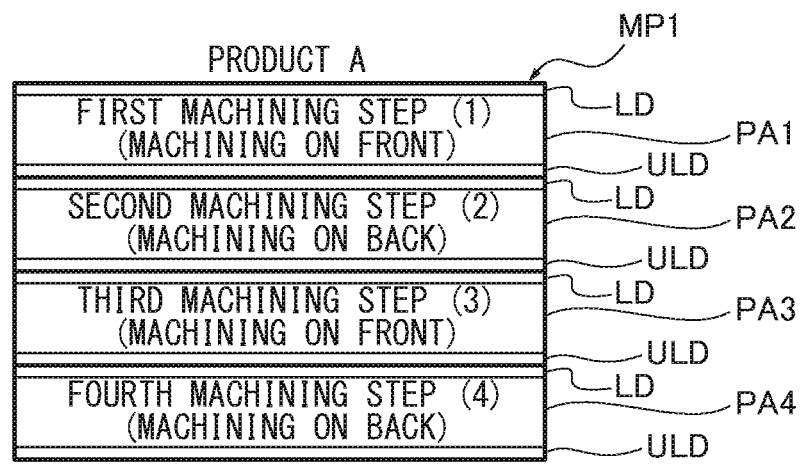
FIG. 6A is a view illustrating an example of a machining step for the product A shown in FIG. 5A.

For example, as shown in FIG. 6A, the production of the product A is performed by four steps including a first front side machining in the module M1 (the first machining step (1)), a first back side machining in the module M2 (the second machining step (2)), a second front side machining in the module M3 (the third machining step (3)), and a second back side machining in the module M4 (the fourth machining step (4)). Each of the machining steps includes loading of an un-machined workpiece, transferring of the workpiece among the modules M1 to M4, and/or loading step and unloading step for the machined workpiece. The same applies to the machining steps for the product B to the product E described below.

FIGS. 6A to 6E schematically show machining steps for producing the products A to E and the machining programs PA1 to PA4, PB1 to PB2, PC1 to PC2, PD1 to PD3, and PE1 of the workpiece machining programs PA, PB, PC, PD, and PE. Also, FIGS. 6A to 6E schematically show a loading program LD for the loading step and an unloading program ULD for the unloading step provided to top and bottom of the machining programs PA1 to PA4, PB1 to PB2, PC1 to PC2, PD1 to PD3, and PE1, respectively.

Figure 6B:
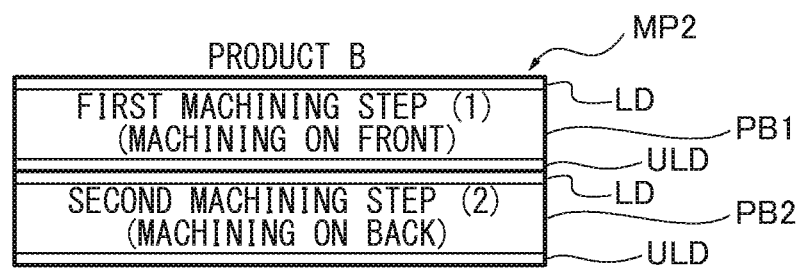
FIG. 6B is a view illustrating an example of a machining step for the product B shown in FIG. 5B.
Figure 6C:
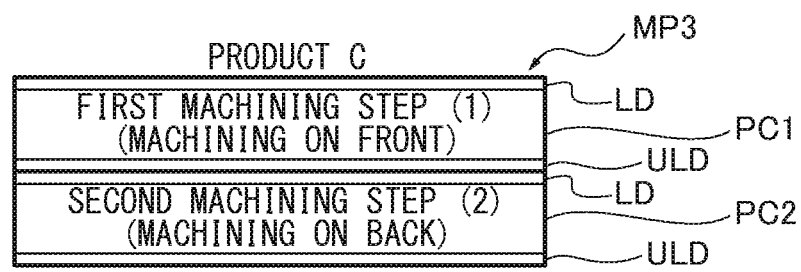
FIG. 6C is a view illustrating an example of a machining step for the product C shown in FIG. 5C.
Figure 6D:
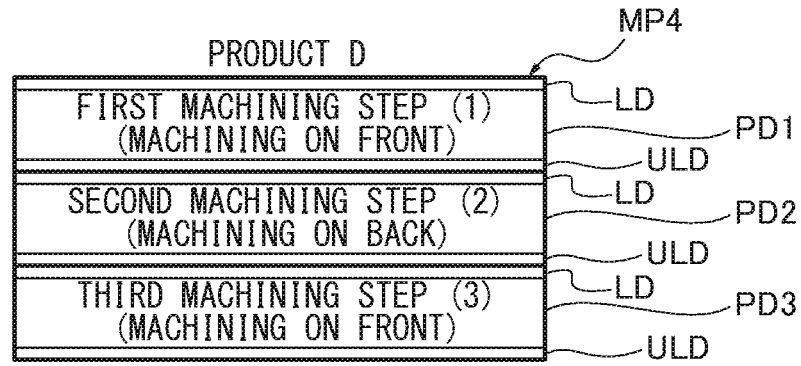
FIG. 6D is a view illustrating an example of a machining step for the product D shown in FIG. 5D.
Figure 6E:
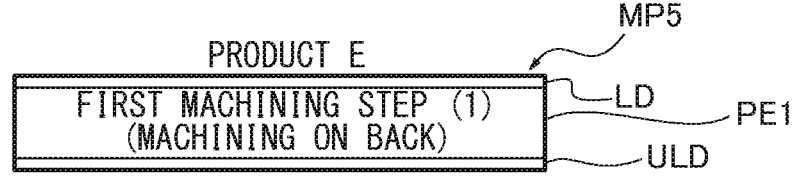
FIG. 6E is a view illustrating an example of a machining step for the product E shown in FIG. 5E.

Similarly, as shown in FIG. 6B, for example, the production of the product B is performed by two steps including the front side machining in the module M1 (the first machining step (1)) and the back side machining in the module M2 (the second machining step (2)). As shown in FIG. 6C, for example, the production of the product C is performed by two steps including the front side machining in the module M3 (the first machining step (1)) and the back side machining in the module M4 (the second machining step (2)). As shown in FIG. 6D, for example, the production of the product D is performed by three steps including the first front side machining in the module M1 (the first machining step (1)), the first back side machining in the module M2 (the second machining step (2)), and the second front side machining in the module M3 (the third machining step (3)). As shown in FIG. 6E, for example, the production of the product E is performed by one step including the back side machining in the module M4 (the first machining step (1)).

Next, creation of the operation schedule data in this machining example and control of the modules M1 to M4 based on the operation schedule data will be described with reference to flowcharts shown in FIGS. 14A to 14E.

Figure 14A:
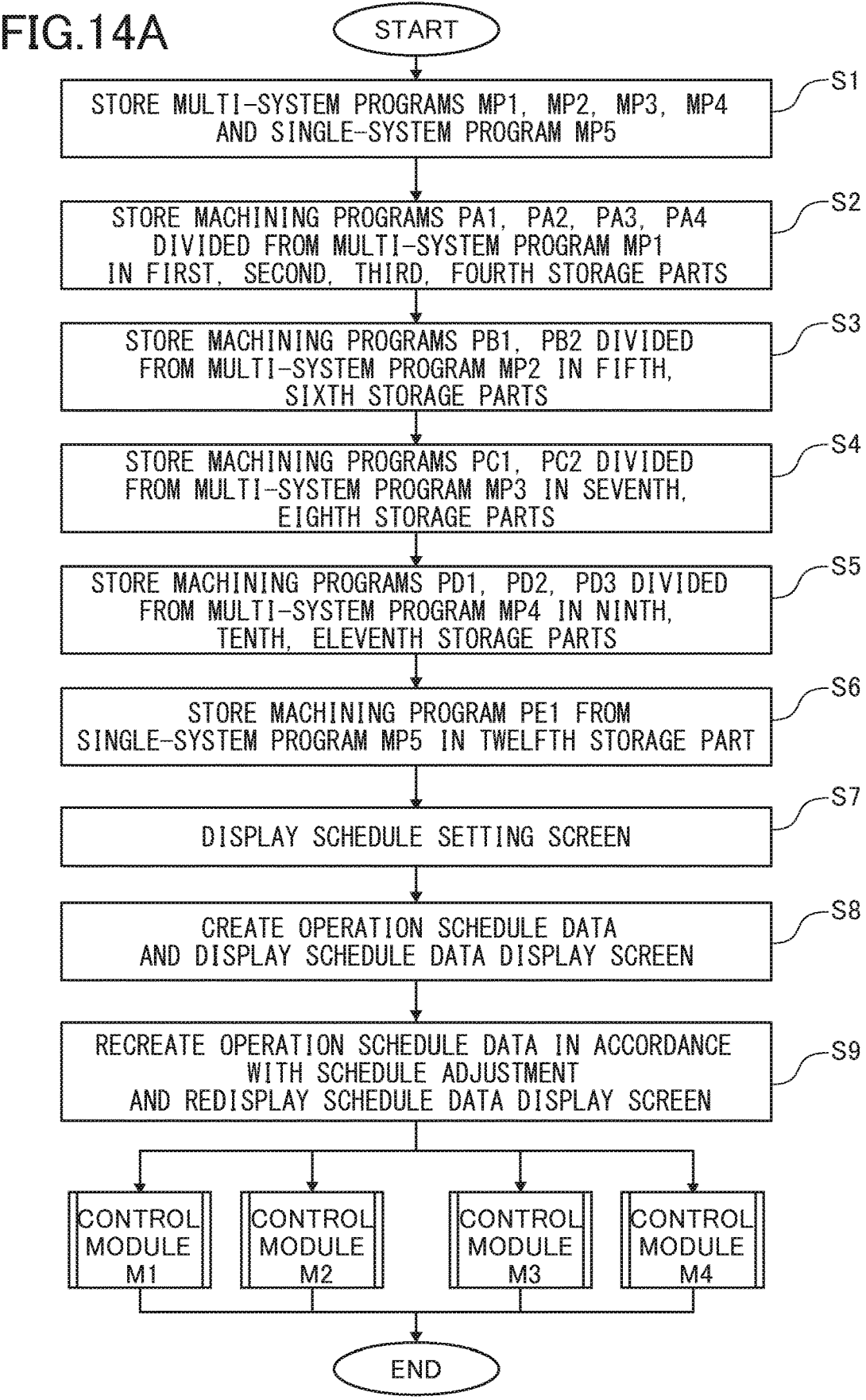
FIG. 14A is a flowchart showing a control for driving the modules executed by the control device in the machining example.

First, the creation of the operation schedule data will be described with reference to the flowchart shown in FIG. 14A. The multi-system program MP1, MP2, MP3, and MP4 for producing the product A, the product B, the product C, and the product D, and the single-system program MP5 for producing the product E shown in FIGS. 6A to 6E are created in the control device 20 and/or external computers and the like.

The control device 20 stores (records) the multi-system programs MP1, MP2, MP3, and MP4 and the single-system program MP5 in the multi-system program storage part 30 via the program input part 23 (Step S1).

After the multi-system programs MP1, MP2, MP3, and MP4 and the single-system program MP5 are stored in the multi-system program storage part 30, the multi-system program dividing part 31 divides each of the multi-system programs into machining programs and stores them in the storage parts of the divided program storage part 32, respectively. For example, the machining program PA1 divided from the multi-system program MP1 is stored in the first storage part of the divided program storage part 32; the machining program PA2 is stored in the second storage part; the machining program PA3 is stored in the third storage part; and the machining program PA4 is stored in the fourth storage part (Step S2).

In addition, the multi-system program dividing part 31 stores the machining program PB1 divided from the multi-system program MP2 in the fifth storage part of the divided program storage part 32 and stores the machining program PB2 to the sixth storage part, for example (Step S3).

Also, the multi-system program dividing part 31 stores the machining program PC1 divided from the multi-system program MP3 in the seventh storage part of the divided program storage part 32, and stores the machining program PC2 in the eighth storage part, for example (Step S4).

Further, the multi-system program dividing part 31 stores the machining program PD1 divided from the multi-system program MP4 in the ninth storage part of the divided program storage part 32, stores the machining program PD2 in the tenth storage part, and stores the machining program PD3 in the eleventh storage part, for example (Step S5).

Moreover, the multi-system program dividing part 31 stores the machining program PE1 from the single-system program MP5 in the twelfth storage part of the divided program storage part 32, for example (Step S6).

Next, the schedule managing part 26 displays the schedule setting screen on the display 22a automatically or responsive to an instruction from the operation panel 22 (Step S7). For example, as shown in FIG. 7, the schedule setting screen displays the supplying time, the machining time, the unloading time, and the machining flow of the workpieces for the products A to E calculated by the schedule managing part 26 based on the multi-system programs stored in the multi-system program storage part 30. At this time, if the machining by the machine tool 100 has already performed and the supplying time, the machining time, and the unloading time have already been measured, the measured values are displayed on the schedule setting screen for the supplying time, the machining time, and the unloading time.

In the example shown in FIG. 7, "2" for the product A, "2" for the product B, "5" for the product C, and "2" for the product D are input in the cells of the production quantity. Here, since the product E is not produced, "0" is input in the cell of the production quantity and "NULL" is input in the cell of "STATE" for the product E.

The operator may manually set the operation schedule data. In this case, the operator may input or adjust the production quantity of the products A to E, the supplying time, the machining time, the unloading time, or the like on the schedule setting screen, for example.

Next, the operator gives a command by clicking the "CREATION" button or the like on the schedule setting screen to create the schedule. Receiving the command, the schedule managing part 26 creates the operation schedule data based on the machining programs of the each system and the number of the products, and stores the data in the operation schedule data storage part 27. In the initial state before starting the first machining by the machine tool 100, the operation schedule data is created by the program analysis and/or the manual input based on the product quantity, the initial values for each step, and the like. In the case where the machining has already performed by the machine tool 100 and the execute time for each step has been measured, the operation schedule data is created based on the product quantity, the measured values for each machining step, and the like. As shown in FIG. 8, the schedule managing part 26 displays the schedule display screen on the display 22a based on the created operation schedule data (Step S8). If the operation schedule data is not set and/or the number of the products is not changed, the schedule display screen is displayed based on the existing operation schedule data responsive to a click on the "CREATION" button or the like. The operator can visually recognize the operation schedule by visually checking the schedule display screen.

The operator can adjust the schedule on the schedule display screen by moving any machining programs to the idle time and/or replacing the machining programs. After the schedule is adjusted on the schedule display screen, it proceeds to Step S9 and the schedule managing part 26 recreates the operation schedule data. Based on the recreated operation schedule data, the schedule display screen as shown in FIG. 9 is redisplayed. If the schedule is not adjusted, Step S9 is skipped.

In the example of FIG. 8, the idle time which is equal to or more than predetermined time exists forward of the third machining step "PA3-1" and the fourth machining step "PA4-1 for the first product A. Therefore, as shown in FIG. 9, the first machining step "PC1-1" and the second machining step "PC2-1" for the first product C are manually moved forward of the third machining step "PA3-1" and the fourth machining step "PA4-1" for the first product A. This movement automatically moves up the starting time for the first and second machining steps for the second to fifth products C and the starting time for the first to third machining steps for the two products D.

The idle time may have already existed when the operation schedule data is created based on the initial values by analyzing each multi-system program or the like. Alternatively, the idle time does not exist when creating the operation schedule data based on the initial values, but the idle time may be generated when the measured values measured by the execution of the machining are reflected. With the schedule display screen in this embodiment, the operator can easily check the existence of the idle time and the order of the machining steps and easily adjust the schedule. By adjusting the schedule, the operation schedule data can be effectively created, and work efficiency and productivity in the machine tool 100 can be improved. Particularly, the operation schedule data is created based on the measured values for each step in each machining program so that the schedule can be adjusted with higher accuracy according to the actual operating condition of the machine tool 100 and work efficiency and productivity in the machine tool 100 can be more improved.

When the creation of the operation schedule data and the recreation by adjusting the schedule are completed, and a command to start machining is received, the control device 20 stores and executes the machining programs for each system based on the operation schedule data edited (created) on the schedule display screen. At this time, the control device 20 measures the execution time for each step in the machining program.

Thereby, the machining in each of the modules M1 to M4 is sequentially performed based on the corresponding machining programs P1 to P4. Along with this, the machining in each of the modules M1 to M4 ("CONTROL MODULE M1 to M4" shown in FIGS. 14A to 14E) is performed in parallel, and accordingly, a predetermined number of the products A to E can be produced.

In the module M1, the machining in the first machining step is continuously performed relative to two workpieces corresponding to the product A. Then, the machining in the first machining step is continuously performed relative to the two workpieces corresponding to the product B. Next, the machining in the first machining step is continuously performed relative to the two workpieces corresponding to the product D.

Figure 14B:
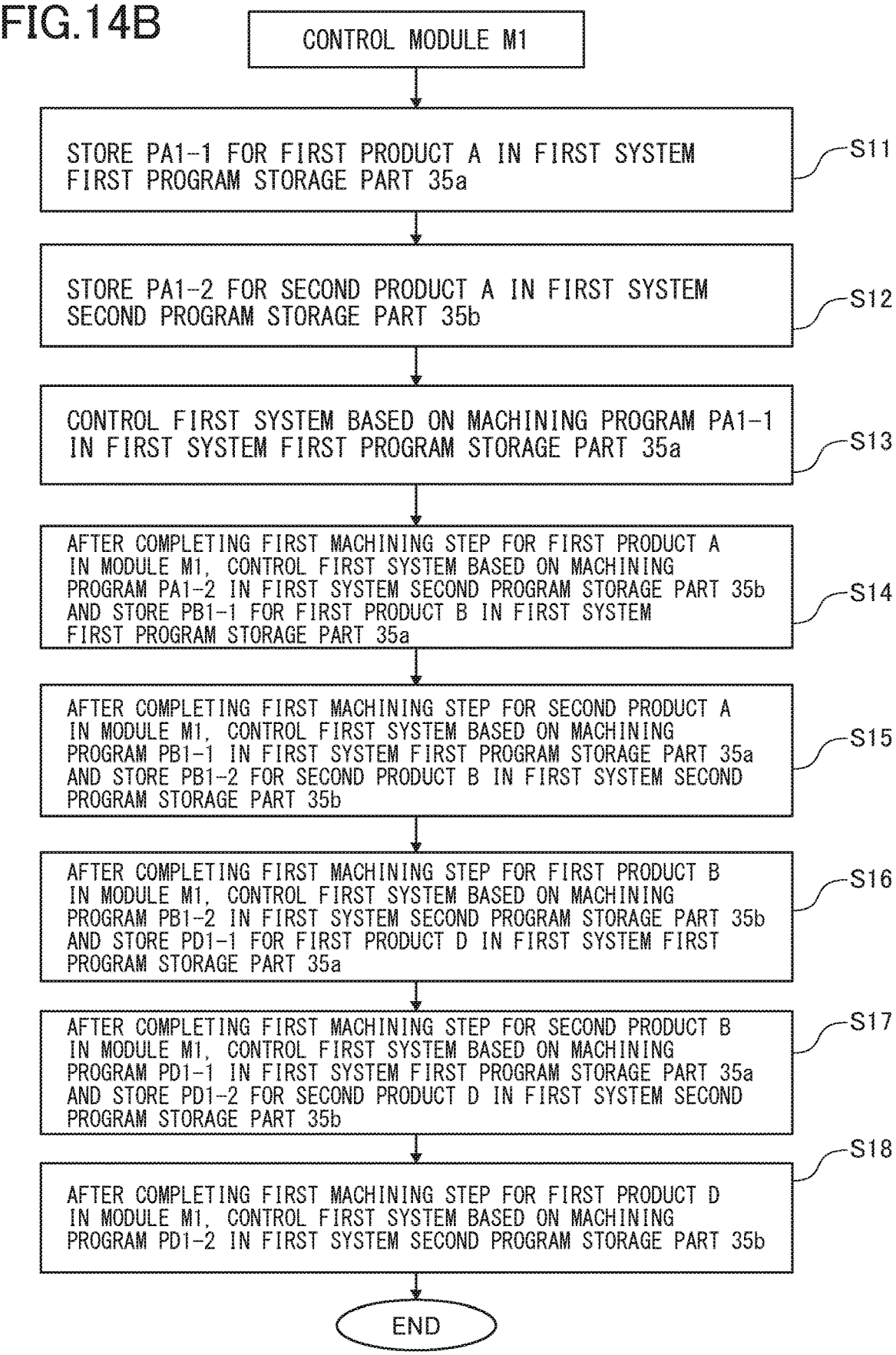
FIG. 14B is a flowchart showing a control for driving a module M1 executed by the control device.

In control of the module M1 shown in the flowchart of FIG. 14B, based the operation schedule data, the machining program selection part 33 stores the machining program PA1 loaded from the first storage part in the first system first program storage part 35a as the machining program PA1-1 for the first product A (Step S11).

Also, the machining program selection part 33 stores the machining program PA1 loaded from the first storage part in the first system second program storage part 35b as the machining program PA1-2 for the second product A (Step S12).

Then, the first system control part 25a of the system control part 25 controls the first system based on the machining program PA1-1 in the first system first program storage part 35a. With the above control, the module M1 performs the first machining step of the first product A relative to the supplied workpiece (Step S13).

After completing the first machining step in the module M1 relative to the workpiece for the first product A, the first system control part 25a controls the first system based on the machining program PA1-2 in the first system second program storage part 35b. With the above control, the module M1 performs the first machining step of the second product A relative to the supplied workpiece. At this time, the machining program selection part 33 stores the machining program PB1 loaded from the fifth storage part in the first system first program storage part 35a as the machining program PB1-1 for the first product B to be executed next, and replaces the machining program in the first system first program storage part 35a (Step S14).

After completing the first machining step in the module M1 relative to the workpiece for the second product A, the first system control part 25a controls the first system based on the machining program PB1-1 in the first system first program storage part 35a. With the above control, the module M1 performs the first machining step of the first product B relative to the supplied workpiece. The machining program selection part 33 stores the machining program PB1 loaded from the fifth storage part in the first system second program storage part 35b as the machining program PB1-2 for the second product B (Step S15).

After completing the first machining step in the module M1 relative to the workpiece for the first product B, the first system control part 25a controls the first system based on the machining program PB1-2 in the first system second program storage part 35b. With the above control, the module M1 performs the first machining step of the second product B relative to the supplied workpiece. The machining program selection part 33 stores the machining program PD1 loaded from the ninth storage part in the first system first program storage part 35a as the machining program PD1-1 for the first product D (Step S16).

After completing the first machining step in the module M1 relative to the workpiece for the second product B, the first system control part 25a controls the first system based on the machining program PD1-1 in the first system first program storage part 35a. With the above control, the module M1 performs the first machining step of the first product D relative to the supplied workpiece. The machining program selection part 33 stores the machining program PD1 loaded from the ninth storage part in the first system second program storage part 35b as the machining program PD1-2 for the second product D (Step S17).

Finally, after completing the first machining step in the module M1 relative to the workpiece for the first product D, the first system control part 25a controls the first system based on the machining program PD1-2 in the first system second program storage part 35b. With the above control, the module M1 performs the first machining step of the second product D relative to the supplied workpiece (Step S18). By the above processes, the machining steps in the module M1 are completed.

On the other hand, in the module M2, receiving from the module M1 the workpiece for the product A wherein the machining in the first machining step has been completed and machining the received workpiece for the product A in the second machining step are continuously performed twice. Next, receiving from the module M1 the workpiece for the product B wherein the machining in the first machining step has been completed and machining the received workpiece for the product B in the second machining step are continuously performed twice. Then, receiving from the module M1 the workpiece for the product D wherein the machining in the first machining step has been completed and machining the received workpiece for the product D in the second machining step are continuously performed twice.

Figure 14C:
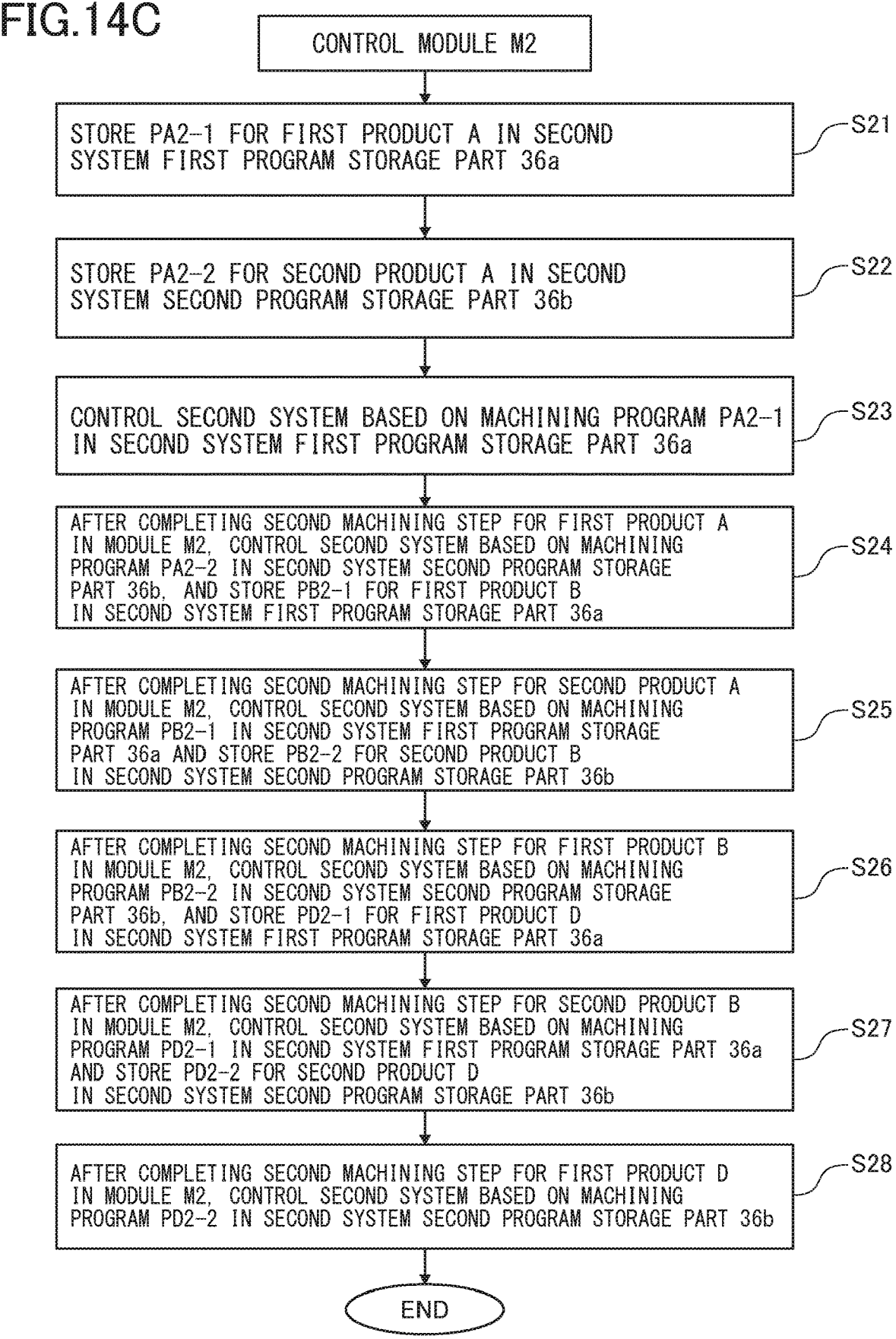
FIG. 14C is a flowchart showing a control for driving a module M2 executed by the control device.

To perform the machining steps in the module M2, in the control of the module M2 shown in the flowchart of FIG. 14C, the machining program selection part 33 stores the machining program PA2 loaded from the second storage part in the second system first program storage part 36a as the machining program PA2-1 for the first product A (Step S21).

Also, the machining program PA2 loaded from the second storage part is stored in the second system second program storage part 36b as the machining program PA2-2 for the second product A (Step S22).

Then, the second system control part 25b of the system control part 25 controls the second system based on the machining program PA2-1 in the second system first program storage part 36a. With the above control, the module M2 performs the second machining step of the first product A relative to the supplied workpiece (Step S23).

After completing the second machining step in the module M2 relative to the workpiece for the first product A, the second system control part 25b controls the second system based on the machining program PA2-2 in the second system second program storage part 36b. With the above control, the module M2 performs the second machining step of the second product A relative to the supplied workpiece. Also, the machining program selection part 33 stores the machining program PB2 loaded from the sixth storage part in the second system first program storage part 36a as the machining program PB2-1 for the first product B (Step S24).

Next, after completing the second machining step in the module M2 relative to the workpiece for the second product A, the second system control part 25b controls the second system based on the machining program PB2-1 in the second system first program storage part 36a. With the above control, the module M2 performs the second machining step of the first product B relative to the supplied workpiece. Also, the machining program selection part 33 stores the machining program PB2 loaded from the sixth storage part in the second system second program storage part 36b as the machining program PB2-2 for the second product B (Step S25).

After completing the second machining step in the module M2 relative to the workpiece for the first product B, the second system control part 25b controls the second system based on the machining program PB2-2 in the second system second program storage part 36b. With the above control, the module M2 performs the second machining step of the second product B relative to the supplied workpiece. Also, the machining program selection part 33 stores the machining program PD2 loaded from the tenth storage part in the second system first program storage part 36a as the machining program PD2-1 for the first product D (Step S26).

After completing the second machining step in the module M2 relative to the workpiece for the second product B, the second system control part 25b controls the second system based on the machining program PD2-1 in the second system first program storage part 36a. With the above control, the module M2 performs the second machining step of the first product D relative to the supplied workpiece. Also, the machining program selection part 33 stores the machining program PD2 loaded from the tenth storage part in the second system second program storage part 36b as the machining program PD2-2 for the second product D (Step S27).

Finally, after completing the second machining step in the module M2 relative to the workpiece for the first product D, the second system control part 25b controls the second system based on the machining program PD2-2 in the second system second program storage part 36b. With the above control, the module M2 performs the second machining step of the second product D relative to the supplied workpiece (Step S28). By the above processes, the machining steps in the module M2 are completed.

In the module M3, first, the machining in the first machining step is performed on the workpiece corresponding to the product C. Next, receiving from the module M2 the workpiece for the product A wherein the machining in the second machining step has been completed and machining the received workpiece for the product A in the third machining step are continuously performed twice. Subsequently, machining the workpiece corresponding to the product C in the first machining step is continuously performed four times. Then, receiving from the module M2 the workpiece for the product D wherein the machining in the second machining step has been completed and machining the received workpiece for the product D in the third machining step are continuously performed twice.

Figure 14D:
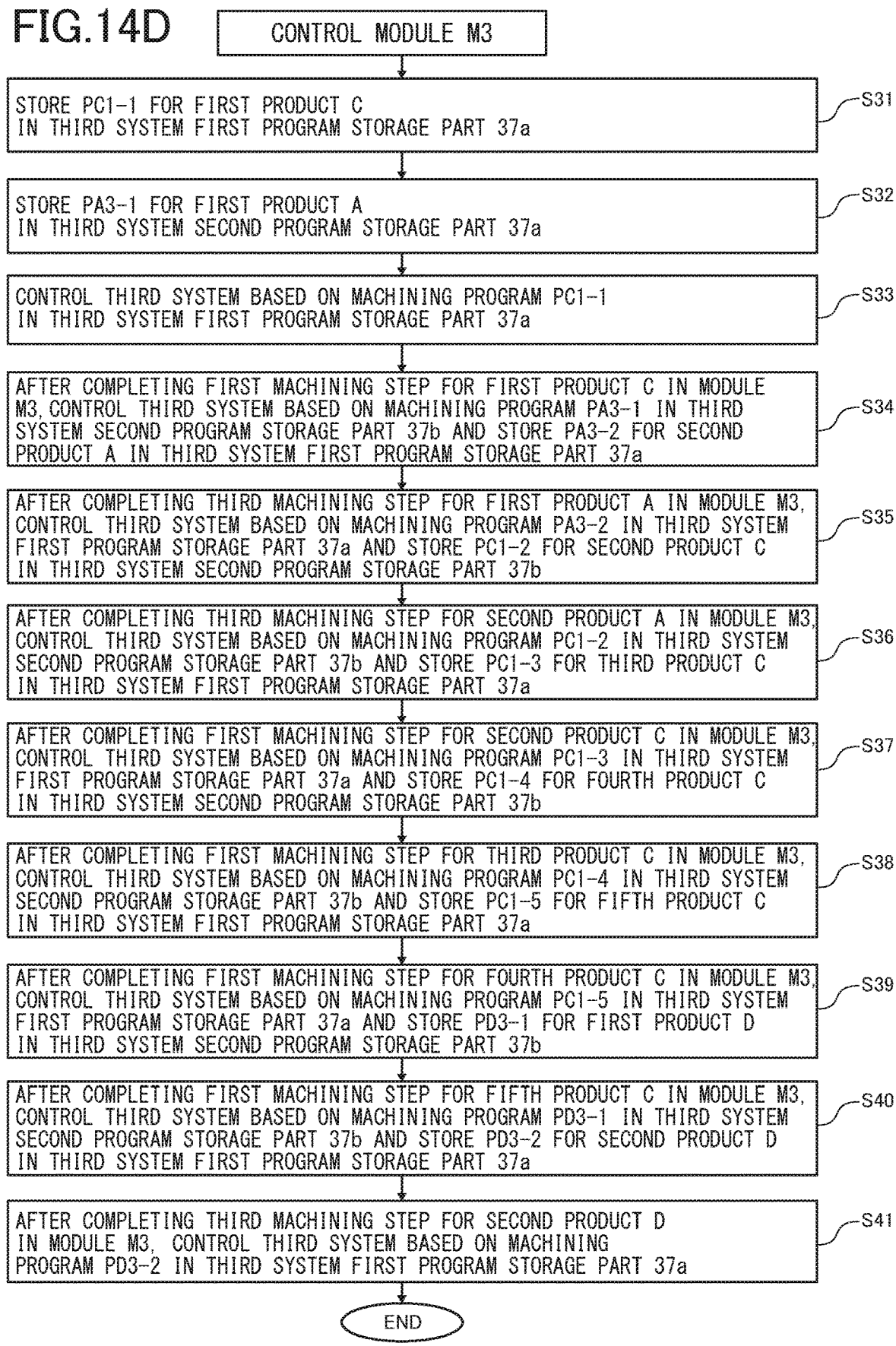
FIG. 14D is a flowchart showing a control for driving a module M3 executed by the control device.

To perform the machining steps in the module M3, in the control of the module M3 shown in the flowchart of FIG. 14D, the machining program selection part 33 stores the machining program PC1 loaded from the seventh storage part in the third system first program storage part 37a as the machining program PC1-1 for the first product C (Step S31).

Also, the machining program selection part 33 stores the machining program PA3 loaded from the third storage part in the third system second program storage part 37b as the machining program PA3-1 for the first product A to be executed next (Step S32).

Then, the third system control part 25c controls the third system based on the machining program PC1-1 in the third system first program storage part 37a. With the above control, the module M3 performs the first machining step of the first product C relative to the supplied workpiece (Step S33).

After completing the first machining step in the module M3 relative to the workpiece for the first product C, the third system control part 25c controls the third system based on the machining program PA3-1 in the third system second program storage part 37b. With the above control, the module M3 performs the third machining step of the first product A relative to the supplied workpiece. Also, the machining program selection part 33 stores the machining program PA3 loaded from the third storage part in the third system first program storage part 37a as the machining program PA3-2 for the second product A (Step S34).

Next, after completing the third machining step in the module M3 relative to the workpiece for the first product A, the third system control part 25c controls the third system based on the machining program PA3-2 in the third system first program storage part 37a. With the above control, the module M3 performs the third machining step of the second product A relative to the supplied workpiece. Also, the machining program selection part 33 stores the machining program PC1 loaded from the seventh storage part in the third system second program storage part 37b as the machining program PC1-2 for the second product C (Step S35).

Then, after completing the third machining step in the module M3 relative to the workpiece for the second product A, the third system control part 25c controls the third system based on the machining program PC1-2 in the third system second program storage part 37b. With the above control, the module M3 performs the first machining step of the second product C relative to the supplied workpiece. Also, the machining program selection part 33 stores the machining program PC1 loaded from the seventh storage part in the third system first program storage part 37*a* as the machining program PC1-3 for the third product C (Step S36).

After completing the first machining step in the module M3 relative to the workpiece for the second product C, the third system control part 25*c* controls the third system based on the machining program PC1-3 in the third system first program storage part 37*a*. With the above control, the module M3 performs the first machining step of the third product C relative to the supplied workpiece. Also, the machining program selection part 33 stores the machining program PC1 loaded from the seventh storage part in the third system second program storage part 37*b* as the machining program PC1-4 for the fourth product C (Step S37).

After completing the first machining step in the module M3 relative to the workpiece for the third product C, the third system control part 25*c* controls the third system based on the machining program PC1-4 in the third system second program storage part 37*b*. With the above control, the module M3 performs the first machining step of the fourth product C relative to the supplied workpiece. Also, the machining program selection part 33 stores the machining program PC1 loaded from the seventh storage part in the third system first program storage part 37*a* as the machining program PC1-5 for the fifth product C (Step S38).

After completing the first machining step in the module M3 relative to the workpiece for the fourth product C, the third system control part 25*c* controls the third system based on the machining program PC1-5 in the third system first program storage part 37*a*. With the above control, the module M3 performs the first machining step of the fifth product C relative to the supplied workpiece. Also, the machining program selection part 33 stores the machining program PD3 loaded from the eleventh storage part in the third system second program storage part 37*b* as the machining program PD3-1 for the first product D (Step S39).

After completing the first machining step in the module M3 relative to the workpiece for the fifth product C, the third system control part 25*c* controls the third system based on the machining program PD3-1 in the third system second program storage part 37*b*. With the above control, the module M3 performs the third machining step of the first product D relative to the supplied workpiece. Also, the machining program selection part 33 stores the machining program PD3 loaded from the eleventh storage part in the third system first program storage part 37*a* as the machining program PD3-2 for the second product D (Step S40).

Finally, after completing the third machining step in the module M3 relative to the workpiece for the second product D, the third system control part 25*c* controls the third system based on the machining program PD3-2 in the third system first program storage part 37*a*. With the above control, the module M3 performs the third machining step of the second product D relative to the supplied workpiece (Step S41). By the above processes, the machining steps in the module M3 are completed.

In the module M4, first, receiving from the module M3 the workpiece for the product C wherein the machining in the first machining step has been completed and machining the received workpiece for the product C in the second machining step are performed. Next, receiving from the module M3 the workpiece for the product A wherein the machining in the third machining step has been completed and machining the received workpiece for the product A in the fourth machining step are continuously performed twice. Then, receiving from the module M3 the workpiece for the product C wherein the machining in the first machining step has been completed and machining the received workpiece for the product C in the second machining step are continuously performed four times.

Figure 14E:
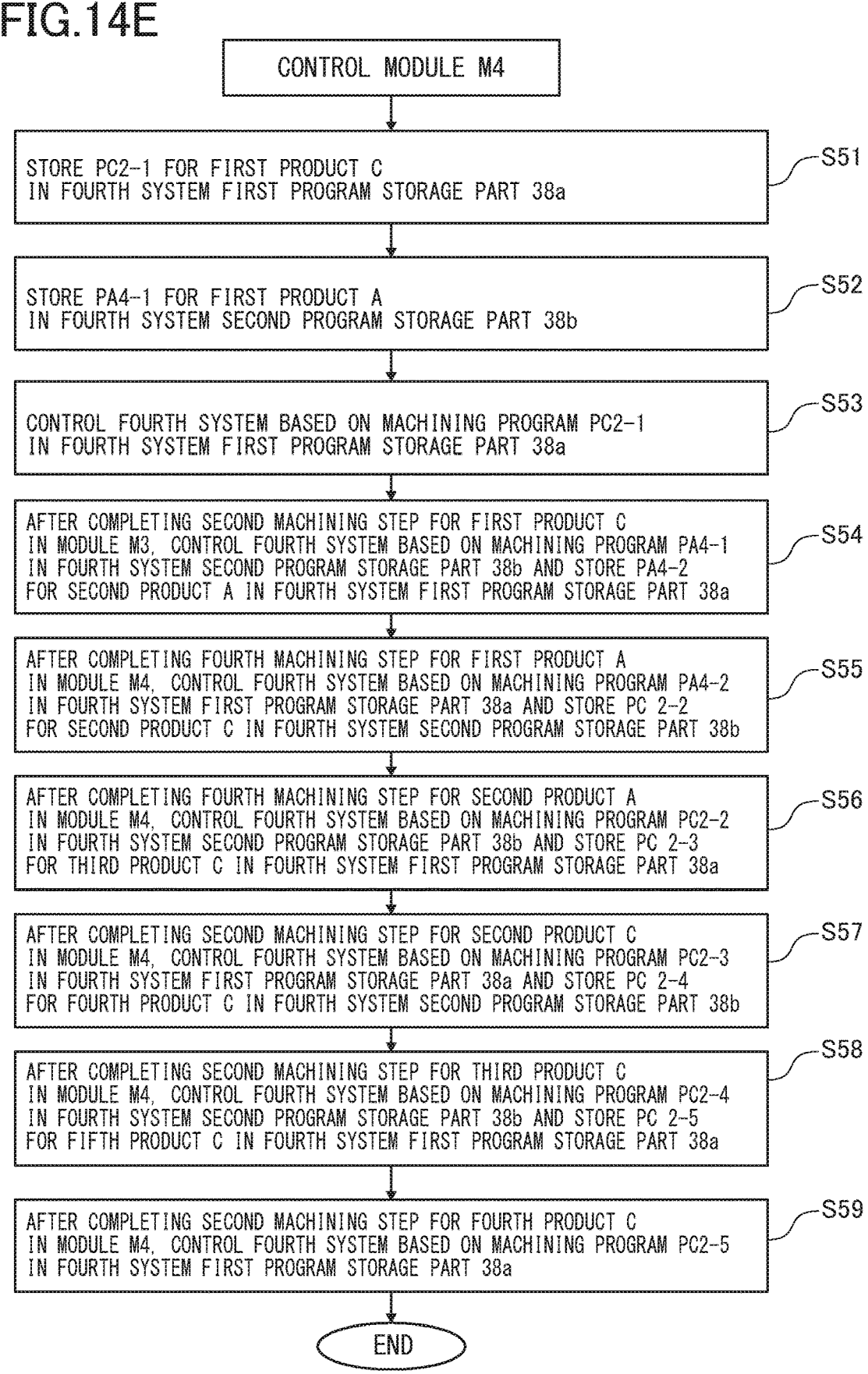
FIG. 14E is a flowchart showing a control for driving a module M4 executed by the control device.

To perform the machining steps in the module M4, in the control of the module M4 shown in the flowchart of FIG. 14E, the machining program selection part 33 stores the machining program PC2 loaded from the eighth storage part in the fourth system first program storage part 38*a* as the machining program PC2-1 for the first product C (Step S51).

Also, the machining program selection part 33 stores the machining program PA4 loaded from the fourth storage part in the fourth system second program storage part 38*b* as the machining program PA4-1 for the first product A (Step S52).

Then, the fourth system control part 25*d* controls the fourth system based on the machining program PC2-1 in the fourth system first program storage part 38*a*. With the above control, the module M4 performs the second machining step of the first product C relative to the supplied workpiece (Step S53).

Then, after completing the second machining step in the module M3 relative to the workpiece for the first product C, the fourth system control part 25*d* controls the fourth system based on the machining program PA4-1 in the fourth system second program storage part 38*b*. With the above control, the module M4 performs the fourth machining step of the first product A relative to the supplied workpiece. Also, the machining program selection part 33 stores the machining program PA4 loaded from the fourth storage part in the fourth system first program storage part 38*a* as the machining program PA4-2 for the second product A (Step S54).

Next, after completing the fourth machining step in the module M4 relative to the workpiece for the first product A, the fourth system control part 25*d* controls the fourth system based on the machining program PA4-2 in the fourth system first program storage part 38*a*. With the above control, the module M4 performs the fourth machining step of the second product A relative to the supplied workpiece. Also, the machining program selection part 33 stores the machining program PC2 loaded from the eighth storage part in the fourth system second program storage part 38*b* as the machining program PC2-2 for the second product C (Step S55).

Then, after completing the fourth machining step in the module M4 relative to the workpiece for the second product A, the fourth system control part 25*d* controls the fourth system based on the machining program PC2-2 in the fourth system second program storage part 38*b*. With the above control, the module M4 performs the second machining step of the second product C relative to the supplied workpiece. Also, the machining program selection part 33 stores the machining program PC2 loaded from the eighth storage part in the fourth system first program storage part 38*a* as the machining program PC2-3 for the third product C (Step S56).

After completing the second machining step in the module M4 relative to the workpiece for the second product C, the fourth system control part 25*d* controls the fourth system based on the machining program PC2-3 in the fourth system first program storage part 38*a*. With the above control, the module M4 performs the second machining step of the third product C relative to the supplied workpiece. Also, the machining program selection part 33 stores the machining program PC2 loaded from the eighth storage part in the fourth system second program storage part 38*b* as the machining program PC2-4 for the fourth product C (Step S57).

After completing the second machining step in the module M4 relative to the workpiece for the third product C, the fourth system control part 25d controls the fourth system based on the machining program PC2-4 in the fourth system second program storage part 38b. With the above control, the module M4 performs the second machining step of the fourth product C relative to the supplied workpiece. Also, the machining program selection part 33 stores the machining program PC2 loaded from the eighth storage part in the fourth system first program storage part 38a as the machining program PC2-5 for the fifth product C (Step S58).

Finally, after completing the second machining step in the module M4 relative to the workpiece for the fourth product C, the fourth system control part 25d controls the fourth system based on the machining program PC2-5 in the fourth system first program storage part 38a. With the above control, the module M4 performs the second machining step of the fifth product C relative to the supplied workpiece (Step S59). By the above processes, the machining steps in the module M4 are completed.

When the product A, the product B, the product C, and the product D each having a predetermined different shape from the others are produced from the workpieces as described above, the machining steps are performed in the four modules M1, M2, M3, and M4 in parallel. Accordingly, the operation downtime of the modules M1, M2, M3, and M4 can be limited.

In addition, a series of machining in the modules M1 to M4 described above are efficiently performed by replacing the machining programs in the system-based program storage part 34 to reduce time loss, so that the machining programs are alternately stored in the first program storage parts 35a, 36a, 37a, and 38a and in the second program storage parts 35b, 36b, 37b, and 38b for each control system and performed by the machining program selection part 33. Therefore, the product A, the product B, the product C, and the product D which are different from each other can be efficiently and successively produced.

Figure 11:
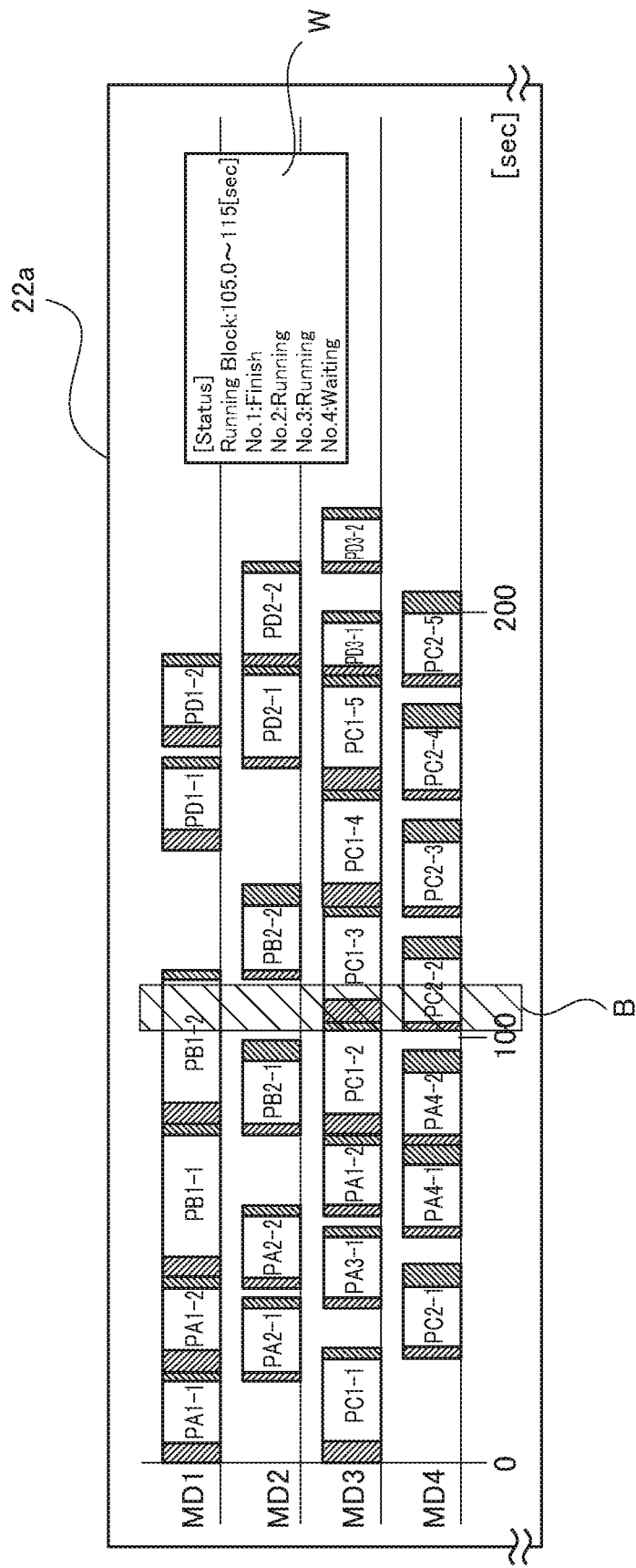
FIG. 11 is a view illustrating an example of the schedule display screen during the execution of the machining programs.

During the operation of the machine tool 100, the state of the operation for each product and the number of products for which the operation has been completed (completed production quantity) are displayed in real time on the schedule display screen as shown in FIG. 10. The schedule display screen displays in real time a bar B which shows the machining programs being executed and a status window W which shows status as shown in FIG. 11. Accordingly, the operator can check the progress of the machining. At this time, the control device 20 measures the actual supplying time, the actual machining time, and the actual unloading time in each step of each machining program. Accordingly, the schedule display screen displays the supplying time, the machining time, and the unloading time of the machining programs which have already executed and to which the measured values are reflected.

Further, the operator can modify the operation schedule data by interrupting the machining program or changing the order of the execution with respect to the operation schedule based on the actual measurement values in the middle of the above-mentioned machining steps. The above modification can be made on the schedule setting screen and/or the schedule display screen. Hereinafter, modification procedure for the operation schedule data will be described with reference to the schedule setting screen shown in FIG. 12, the schedule display screen shown in FIG. 13, and the flowchart shown in FIG. 15.

Now, a so-called interrupt operation in which production of three products E is added will be described. First, the operator performs a predetermined operation to display the schedule setting screen (see FIG. 12) on the display 22a (Step S61). At this time, with regard to the machining programs which have already executed, the supplying time, the machining time, and the unloading time based on the measured values are displayed.

Figure 13:
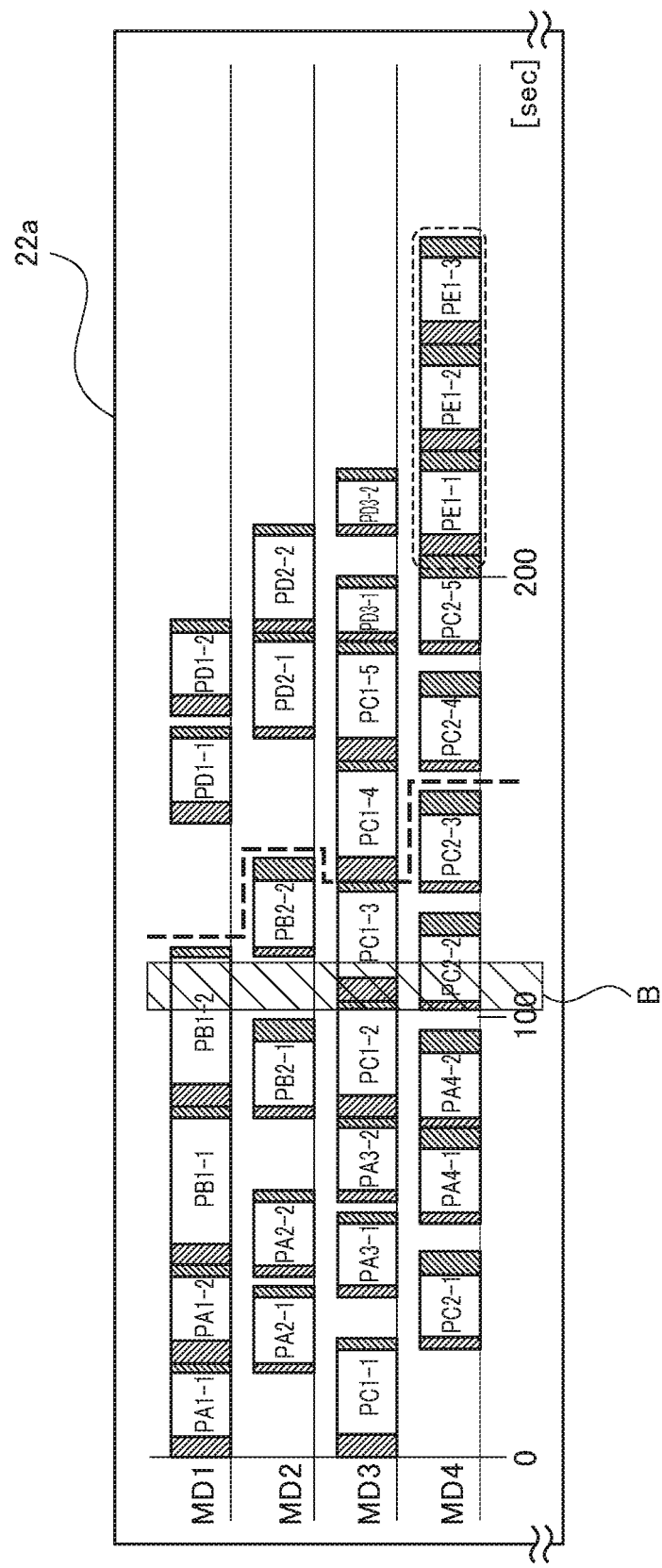
FIG. 13 is a view illustrating an example of the schedule display screen during the interrupt operation.

As shown with a dashed line in FIG. 12, the schedule setting screen receives input with regard to the production quantity (three) of the product E made by the operator (Step S62). With the input, the schedule managing part 26 recreates the operation schedule data by setting the machining programs (PE1-1, PE1-2, and PE1-3) for the three products E after the second machining step (PC2-5) in the module M4 for the product C if the product E can be machined in the module M4. The schedule managing part 26 displays the schedule display screen based on the recreated operation schedule data as shown in FIG. 13 (Step S63).

In addition, the operator can adjust the schedule by moving any of the machining programs to change the order of the execution or the like on the schedule display screen if necessary. The schedule managing part 26 recreates the operation schedule data in accordance with the above schedule adjustment (Step S64).

After completing the recreation of the operation schedule data by the interrupt operation or the schedule adjustment, the machining programs for the added three products E are executed after the machining of the product C in the module M4. The products E can be efficiently produced continuous with the machining of the product C. In addition, the schedule adjustment by changing the order of the execution or the like can reduce operation time and improve work efficiency.

The schedule adjustment for the interrupt operation can be performed by storing the machining programs in the fourth system first program storage part 38a or the fourth system second program storage part 38b without stopping the machine tool 100 during machining the product C. It may be performed after stopping (suspending) the machining by the machine tool 100. Receiving a command for stopping the machining, the control device 20 stops machining in the modules M1 to M4 at appropriate time such as time when the machining of the product is completed. For example, a command is input by the bar B shown in FIG. 13 to stop (suspend) the machining in the modules M1 to M4. Thereby, as shown with a bold line, the machining programs to complete the machining for the product B by the modules M1 and M2, and the machining programs to complete the machining for the product C by the modules M3 and M4 are executed to complete the machining for the products for which the machining has once started. Subsequently, the execution of the machining programs can be stopped to stop (suspend) the machining. After stopping the machining, the schedule adjustment for the machining programs located after the bold line can be performed. In other words, the schedule adjustment for the machining programs which have not executed can be performed.

The measured values measured by the controller 21 are reflected to the machining program which has been executed. Accordingly, the schedule adjustment for the machining programs which have not executed can be performed with a high accuracy in accordance with the actual operating condition of the machine tool 100.

After stopping the machining in each of the modules M1 to M4, the operation schedule data is created by the operator inputting the number of the products E on the schedule setting screen shown in FIG. 12 and clicking the "CREATION" button, for example. Also, the schedule can be adjusted, for example, to move the machining programs and the like if necessary. When the operation schedule data is recreated or the schedule adjustment is completed and then the operation of the machine tool 100 is restarted, the machining programs after the bold line in FIG. 13 and the added machining programs for the product E are continuously executed. The control device 20 measures operation time for the machining programs in each step, which is reflected to the operation schedule data. Accordingly, the machine tool 100 can perform machining in accordance with the actual operating condition, work efficiency for the machining can be improved, and the productivity of the products can be improved.

Though the embodiments of the present disclosure have been described in detail with reference to the drawings, the above embodiments are merely examples of the present disclosure, and the present disclosure is not limited to the configurations in the above embodiments. Design changes without departing from the gist of the present disclosure are included in the present disclosure.

For example, the embodiment relates to the control device 20 for the machine tool 100 including the two fixed modules M1, M3 and the two moving modules M2, M4. However, the present disclosure is not limited to the above configuration. For example, the present disclosure may be applied to a configuration including the two fixed modules M1, M3 and the one moving module M2, or a configuration including a fixed module or three or more fixed modules and three or more moving modules. Also, in the embodiment, machining for a plurality of kinds of different products is continuously performed, but the present disclosure is not limited to the above. The present disclosure may be applied to a case in which machining for one kind of product is continuously performed.

What is claimed is:

1. A control device for a machine tool, the machine tool comprising a plurality of modules each integrally comprising a workpiece gripper that grips a workpiece and an operation-part holder that holds an operation part configured to perform a predetermined operation on the workpiece gripped by the workpiece gripper, the control device comprising:
   a plurality of control systems that are configured to control a driving shaft of the machine tool, the control device controlling the machine tool to machine the workpiece in accordance with a multi-system program, the multi-system program comprising a plurality of machining programs that respectively correspond to the control systems;
   a multi-system program storage part that is configured to store a plurality of the multi-system programs different from each other, the driving shaft of each of the modules being assigned to each of the control systems for each of the modules, and each of the plurality of multi-system programs being executed to machine the workpiece in a shape different from others;
   a multi-system program dividing part that is configured to divide each of the multi-system programs into the machining programs;
   a divided program storage part that is configured to individually store the divided machining programs;
   a system-based program storage part that is configured to store each of the machining programs corresponding to each of the control systems for each control system; and
   a machining program selection part that is configured to select a desired machining program from the divided program storage part in accordance with a machining step to be performed by each of the modules and to store the selected machining program in the system-based program storage part for each predetermined control system,
   wherein the system-based program storage part comprises a plurality of program storage parts for each of the control systems, and the system-based program storage part is configured so that a predetermined machining step is performed in each of the modules for each control system by sequentially referring to the machining programs stored in predetermined two of the program storage parts in each of the control systems, and
   wherein the machining program selection part is configured to replace the machining program stored in one of the two program storage parts while referring to the machining program stored in another of the two program storage parts when the machining program necessary for each of the control systems is selected from the divided program storage part and stored in the system-based program storage part.

2. The control device for the machine tool according to claim 1,
   wherein each of the program storage parts comprises a first program storage part and a second program storage part, and
   wherein the machining program stored in the first program storage part and the machining program stored in the second program storage part are alternately referred.

3. The control device for the machine tool according to claim 1,
   wherein the plurality of modules comprise at least two fixed modules arranged in parallel to each other and at least one moving module disposed to face the fixed modules and to be movable in an arranged direction of the fixed modules, and
   wherein the moving module is configured to transfer the workpiece to the fixed modules and receive the workpiece from the fixed modules.

4. The control device for the machine tool according to claim 1,
   wherein the control device is configured to divide the machining step for the product into machining steps for each of the modules and assign each of the machining steps to each of the modules such as to complete machining by sequentially transferring the workpiece among the modules with regard to a predetermined product machined from the workpiece,
   wherein each of the machining steps for each of the modules is continuously arranged with a machining step corresponding to each of the modules for each of a plurality of kinds of products, and
   wherein the control device is configured to control the machining step for each of the workpiece corresponding to each of the products to be performed in the modules in parallel to perform machining for the plurality of kinds of products.

5. The control device for the machine tool according to claim 1,
   wherein the control device is configured, when idle time equal to or more than predetermined time exists before starting a predetermined machining step for the workpiece, to move a machining step shorter than the idle time before the predetermined machining step and to perform the shorter machining step earlier than the predetermined machining step.

6. The control device for the machine tool according to claim 1,
wherein the control device is configured, during performing a predetermined machining step for the workpiece, to add a machining step for a predetermined product after the predetermined machining step, and successively perform the added machining step continuous with the predetermined machining step.

* * * * *